(12) United States Patent
Saquib et al.

(10) Patent No.: US 12,444,166 B2
(45) Date of Patent: Oct. 14, 2025

(54) OBJECT CLASSIFICATION BASED ON SPATIALLY DISCRIMINATED PARTS

(71) Applicant: Raytheon Company, Arlington, VA (US)

(72) Inventors: Suhail Shabbir Saquib, Shrewsbury, MA (US); Christopher M. Pilcher, Richardson, TX (US); John R. Goulding, Farmersville, TX (US)

(73) Assignee: Raytheon Company, Arlington, VA (US)

( * ) Notice: Subject to any disclaimer, the term of this patent is extended or adjusted under 35 U.S.C. 154(b) by 477 days.

(21) Appl. No.: 17/827,096

(22) Filed: May 27, 2022

(65) Prior Publication Data
US 2023/0419640 A1    Dec. 28, 2023

(51) Int. Cl.
*G06V 10/764* (2022.01)
*G06V 10/22* (2022.01)
*G06V 20/17* (2022.01)

(52) U.S. Cl.
CPC ......... *G06V 10/764* (2022.01); *G06V 10/235* (2022.01); *G06V 20/17* (2022.01)

(58) Field of Classification Search
CPC .... G06V 10/764; G06V 10/235; G06V 20/17; G06V 10/82
See application file for complete search history.

(56) References Cited

U.S. PATENT DOCUMENTS

| | | | |
|---|---|---|---|
| 8,170,272 B1 | 5/2012 | Joslin et al. | |
| 8,565,486 B2 | 10/2013 | Wright et al. | |
| 9,299,010 B2 | 3/2016 | Sathyendra et al. | |
| 11,036,999 B2 | 6/2021 | Warshauer-baker et al. | |
| 11,222,245 B2 | 1/2022 | Pilcher et al. | |
| 2019/0050692 A1 | 2/2019 | Sharma et al. | |
| 2020/0273363 A1* | 8/2020 | Templin | G06N 7/01 |
| 2021/0019528 A1* | 1/2021 | Ghadyali | G06F 11/3409 |
| 2021/0142110 A1* | 5/2021 | Tian | G06V 20/68 |
| 2023/0131935 A1* | 4/2023 | Volkovs | G06V 10/774 382/159 |
| 2024/0054325 A1* | 2/2024 | Ishii | G06T 7/55 |

* cited by examiner

*Primary Examiner* — Iriana Cruz
(74) *Attorney, Agent, or Firm* — Schwegman Lundberg & Woessner, P.A.

(57) ABSTRACT

Devices, systems, and methods for machine learning (ML) automatic target recognition (ATR) decision explanation are provided. A method can include receiving an object specification matrix from an object model database that indicates, for each of a plurality of physical portions of an object, whether each of a plurality of features are present or absent in a physical portion of the physical portions of the object and a proportional physical displacement between the features in the object, receiving feature data indicating for an image of a portion of the object, a likelihood whether each of features are present in the image, determining based on the object specification matrix and the feature data, a probability and corresponding uncertainty that the image corresponds to the object, and providing the probability and corresponding uncertainty of the object to help classify the object.

20 Claims, 16 Drawing Sheets

OBJECT CLASSIFICATION BASED ON SPATIALLY DISCRIMINATED PARTS

TECHNICAL FIELD

Embodiments discussed herein regard devices, systems, and methods for object classification based on spatially discriminated parts by using a Bayesian technique.

BACKGROUND

An automatic target recognizer (ATR) is a real-time or near-real-time image or signal processing system. An ATR typically receives an input stream of data and outputs a list of targets that it has detected and recognized from the input stream of data. An ATR system can perform other functions such as image stabilization, preprocessing, mosaicking, target tracking, activity recognition, multi-sensor fusion, common operating picture, sensor and platform control, and data organizing for transmission or display. ATR input data can be in the form of non-imaging one-dimensional (ID) sensor returns, such as ultra-high range-resolution (HRR) radar returns for air-to-air automatic target recognition or vibration signatures from a laser radar for recognition of ground targets. ATR data can have two-dimensional (2D) images that fall into three general views: perspective, plan, and profile. Typical 2D images for ATR are infrared and synthetic aperture radar (SAR) images. ATR input data can be three-dimensional (3D), such as those from sequences of multiple exposures taken over time from a non-stationary position. As a target moves, so do sensors, and that movement can be exploited by an ATR. Hyperspectral data, which are views of the same scene looking in different spectral bands, is another approach to obtaining multiple image data where the third dimension is wavelength. Many inverse synthetic aperture radar (ISAR) images lack detail due to low integration times limited by target rotational acceleration. Lack of information on the location of masts and superstructures limits the ability of any classification method to accurately select the correct target.

The Johnson discrimination methodology is the basis for today's ATR standards. Rosell then proposed a detailed discrimination level breakdown into four categories: detection, type recognition, classical recognition, and identification. Detection means an object, rather than noise, is present. Type recognition means an object is discerned with sufficient clarity that its general class can be differentiated, as in combatants versus merchants/auxiliaries. Classical recognition means an object is discerned with sufficient clarity that its specific class can be differentiated, as in frigate versus destroyer/cruiser. Identification means an object is discerned with sufficient clarity to specify the type within the class, as in Arleigh Burke versus Ticonderoga.

Deep learning (DL) methods have shown great promise in recent times for classification problems. These approaches rely on a wealth of labeled training data to automatically learn discriminating features from the data and handily surpass the performance of systems that rely on hand crafted features based on domain knowledge. However, there are a number of drawback to these methods that make them less than ideal: First, the reliance on enormous amounts of labeled training data is a serious shortcoming, which makes them impractical to deploy in a variety of application areas. Second, they can also be very fragile in their field performance if the training data does not adequately represent the real-world variations in the detected objects and sensor-to-sensor variability and noise in the data acquisition process. Third, they are fairly rigid and not easily adaptable in the field to learn new classes of objects that have not been seen during training. Finally, the lack of transparency in the decision-making process (DL systems are akin to a black box) and explainability of "how" or "why" the decision was made is a serious impediment to human operators in terms of developing trust and being comfortable with the results.

Model-based methods alleviate some of the above drawbacks but come with their own set of issues. Building a model from first principles to mimic the physics of the data acquisition process starting from a physical model of the object eliminates the need of training data and the flexibility to exercise the model for any user defined object and imaging geometries. However, modeling physical reality is highly complex and typically simplifying assumptions are made to make the model tractable. In a lot of instances, the model is watered down to such an extent that it fails to capture the richness of the data in the real world. The model mismatch error becomes a large source of error and significantly reduces the field performance of such methods. Furthermore, the physical model simulates the data given the object. But classification problems really require the inverse solution, i.e., determining the object that generated the observed data. Given the complexity of the forward model, the inverse solution is usually intractable.

DETAILED DESCRIPTION

Figure 1:
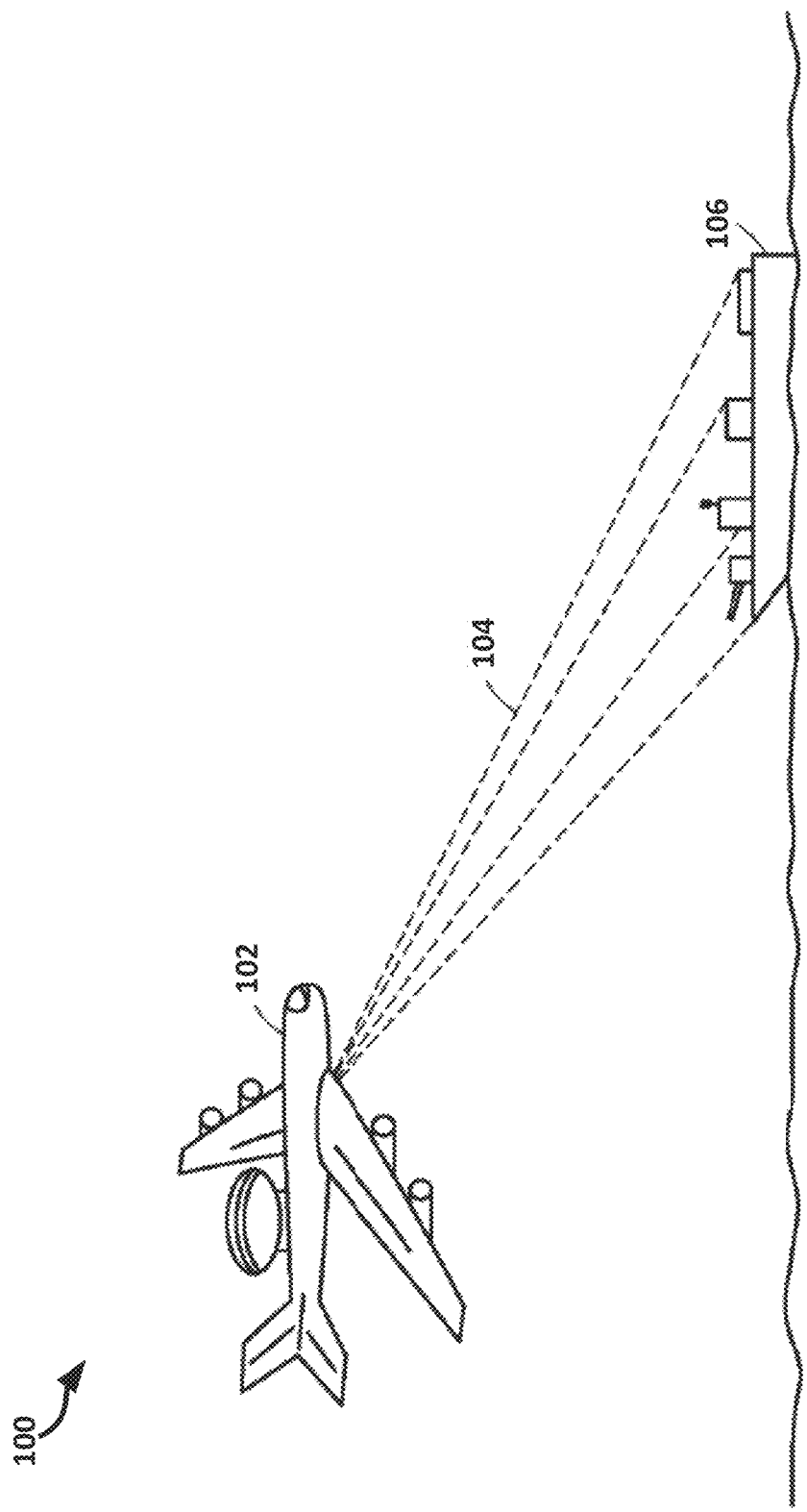
FIG. 1 is a view 100 of an aircraft using a radar system to capture image data associated with a target naval vessel.

Embodiments can mitigate some of the drawbacks outlined in the Background by combining the benefits of data-based DL methods and model-based methods. Embodiments are described regarding a ship classification problem using inverse synthetic aperture radar (ISAR) images, but are applicable to many other objects to be recognized, such as airplanes, antennas, buildings, convoys, foliage, gatherings, installations, land masses, space systems, unmanned aerial vehicles (UAVs), other vehicles, or the like, and images to be analyzed, such as color, infrared (IR), multispectral, light detection and ranging (LIDAR), sound detection and ranging (SONAR), or other images.

Embodiments mitigate some of the drawbacks outlined in the Background by breaking the overall problem into two constituent models, namely, a ship model (or more generally an object model) in terms of some high-level features and a data model for the high-level features. Most ships (or more generally, objects) can be characterized by a small well-defined set of features that are linearly arranged in some unique pattern along the length overall (LOA) of the ship. LOA is the maximum length of a vessel's hull measured parallel to the waterline.

Note that LOA is just one possible dimension of interest and more than one dimension can be used to discriminate parts. Other dimensions include width, height, polar angle, a combination thereof or the like. Part of the problem is therefore amenable to a model-based approach, where a ship is modeled in terms of a unique pattern of high-level features such as mast, funnel, deck, gun, crane, etc. Such a model can be easily elicited by an expert using domain knowledge. The data model deals with how these high-level features manifest themselves in the observed data. This is a highly complex process and it can be handled by a data-based DL approach. The empirical data model can directly be inverted in the training process, where the DL model (typically implemented using a convolutional neural network (CNN)) learns to map the observed data to the feature that produces it from a set of labeled training data.

This sub-division of the model into two parts has several advantages. The ship portion of the model is not opaque anymore and can be modified or added to even after the classification system is deployed. Furthermore, this subdivision of the model into two parts also benefits the DL models by explicitly separating the feature extraction portion from the classification portion. As opposed to creating a single monolithic DL model to perform classification, training the DL model on high-level features structures the DL model to learn the low-level embeddings with respect to the high-level features and not the ship class. Because people build ships similarly, for example a crane on one ship looks similar to a crane on another ship, the DL model generalizes the high-level features across multiple ship classes. Thus, new ships can be added at any time as long as they use the standard feature set; no retraining of the model is required. The operator can task the system to find a "never before seen" ship based solely on intelligence acquired from other sources as to what the ship might look like. The system itself can identify new ships once it determines that the data does not match the known database of ships. Once these newly found ships are classified by a human operator, they can be added to the database enabling online learning. The complexity of the data model has been reduced as well mitigating some of the disadvantages of deep learning solutions. The simpler feature set of a single high-level feature reduces the amount of training data required and improves the robustness of the solution to variations in the field. Finally, the transparency of the decision-making process is improved as the two-step process opens up interpretable intermediate results that can now be probed and displayed to the user.

Embodiments use a probabilistic framework to tie the two models together. Embodiments use two different ship models: one that is discretized along the LOA of the ship and another one that is analog. The data model can be implemented using CNNs trained to discriminate one of the different high-level features and are treated as binary discriminators with soft classification of the feature being present or absent. Classification of the ship given the observed data is achieved by using a maximum a posteriori (MAP) estimate.

The MAP estimator operates in a very high-dimensional feature space so visualizing the test sample relative to ship models in the database is challenging. Embodiments use a method of sensitivity analysis that informs the user which feature in the ship model was most responsible for the current decision and what is the smallest change that can be made to the discriminated feature set that would switch the decision to a competing class. The posterior probability of all the ships in the database after having observed the data enables embodiments to associate a confidence to all ships under consideration. In addition to computing the confidence metric on the decision, embodiments can also compute an error bar on the confidence using sensitivity analysis to show the underlying uncertainty in the final decision. The error bars can be used by downstream processing methods or fusion across multiple discriminators to weight the decisions (e.g., in an optimal manner).

Embodiments extend the Johnson-Rosell methodology to the characteristics of ship architecture to include hull shape, decks, superstructure, uprights, and the like for type recognition, and forecastle, fantail, landing deck, triangular superstructure, blocky superstructure, mast, crane, kingpost, funnel and the like for classical recognition, and solid, lattice, pole or composite mast and the like for identification. Because features may be detected, type recognized, classically recognized, and identified, the generic term "discrimination" is used to encompass all forms and for clarity of reading.

FIG. 1 is a view 100 of an aircraft 102 using a radar system to capture image data associated with a target naval vessel 106. The view 100 shows aircraft 102 emitting radar beams 104 from an antenna to illuminate the vessel 106, which enables aircraft 102 to capture radar pulses echoed back toward the aircraft 102 as it moves through the air. As the antenna location changes with respect to time, a radar system in aircraft 102, which may be an ISAR, combines recordings at multiple positions of the aircraft 102 and its antenna to form a synthetic antenna aperture. This allows the radar system to generate high-resolution images and/or data of the target vessel 106 using a relatively small antenna.

Aircraft 102 may have an ATR system that receives raw target data and/or target images from a radar system of aircraft 102. The aircraft 102 may have an image acquisition system that receives data from a radar receiver, processes the data into images, and provides the images of vessel 106 to the ATR. The aircraft 102 may send its raw or processed target and/or image data to other land, sea, or air entities. For example, aircraft 102 may be communicatively linked with other aircrafts, vessels, or facilities via a system that enables aircraft 102 to transmit target data and/or images to a remote ATR system at another entity connected to the system. The aircraft 102 may also operate bi-statically to receive radar pulses from another aircraft or ground transmitter.

While FIG. 1 explains embodiments in terms of ISAR on an aircraft, embodiments are also applicable to laser detection and ranging (LADAR), sound detection and ranging (SONAR), multi-spectral imaging, or the like. The images can be provided by a sensor (e.g., ISAR, SAR, LADAR, SONAR, electro-optical/infrared (EO/IR), or the like) on a moving or stationary platform (e.g., manned, or unmanned aircraft, satellite, balloon, ship, ground vehicle, submarine, observatory, or the like).

Figure 2:
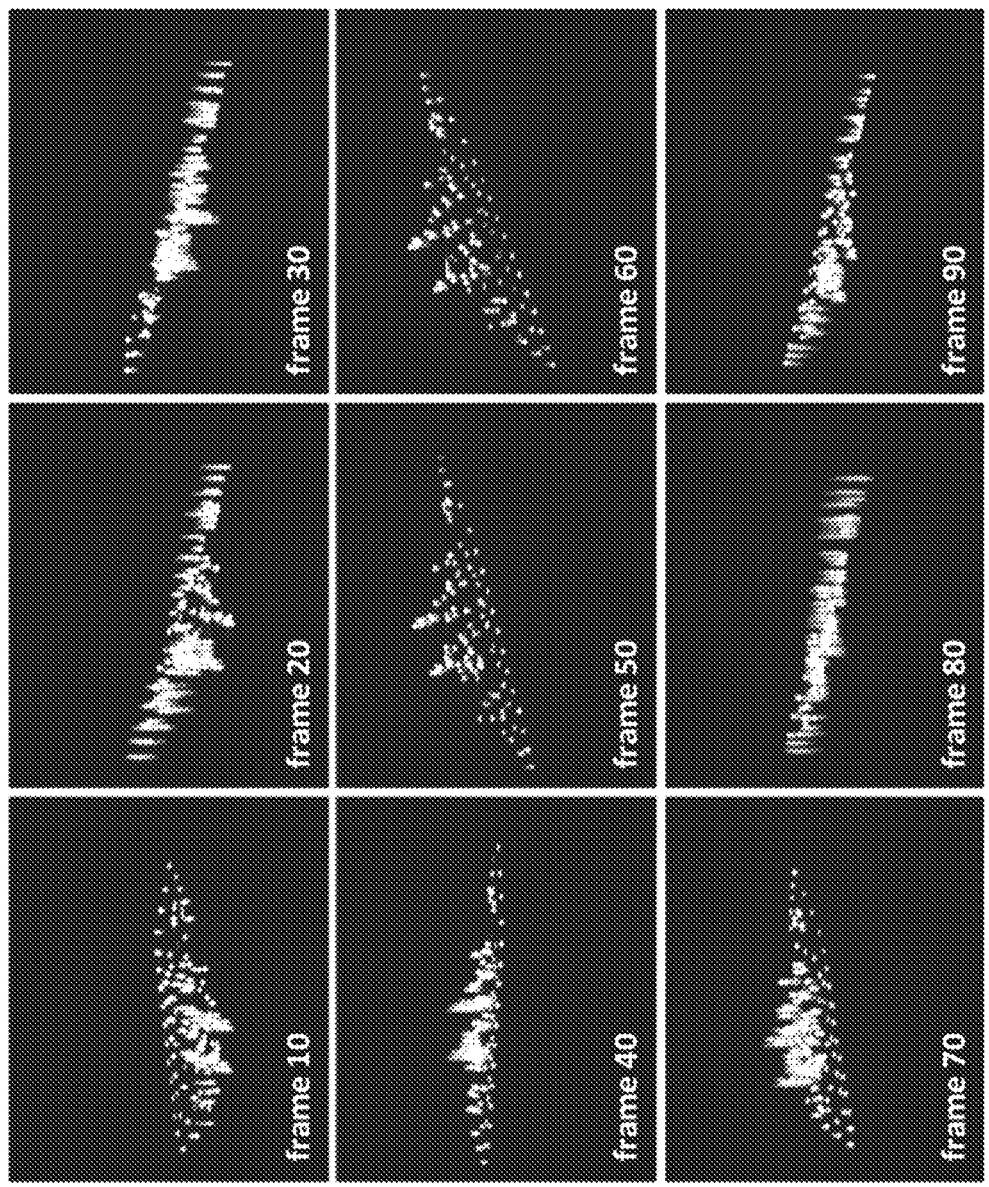
FIG. 2 illustrates, by way of example, a time sequence of processed synthetic ISAR images of a same object.

FIG. 2 illustrates, by way of example, a time sequence of processed synthetic ISAR images 200 of a same object. The images include range along the x-axis and Doppler along the y-axis. ISAR uses six degrees of freedom (DoF) motion of the target to form range/Doppler imagery. The six DoF include roll, pitch, yaw, heave, sway, and surge. Periodic target motion causes ISAR image utility (in terms of usefulness for ML models and human analysts) to vary. For example, for a ship in an environment of sea state 3, a motion period is on the order of 9 seconds and for sea state 0, the motion period is on the order of 90 seconds. The ISAR images 200 are for a ship in sea state 0. As can be seen, some of the images provide detail sufficient for a human identifying parts of the ship (e.g., frames 40, 50, 60, and 70), while other of the images provide insufficient detail for a human identifying parts of the ship (e.g., frames 30 and 80). This means that only some of the ISAR images generated in this motion period could be labelled manually by a human to be used for ML classification while others could not be labelled manually. For example, frames 30 and 80 of the images 200 can be particularly difficult for a human to label.

Figure 3:
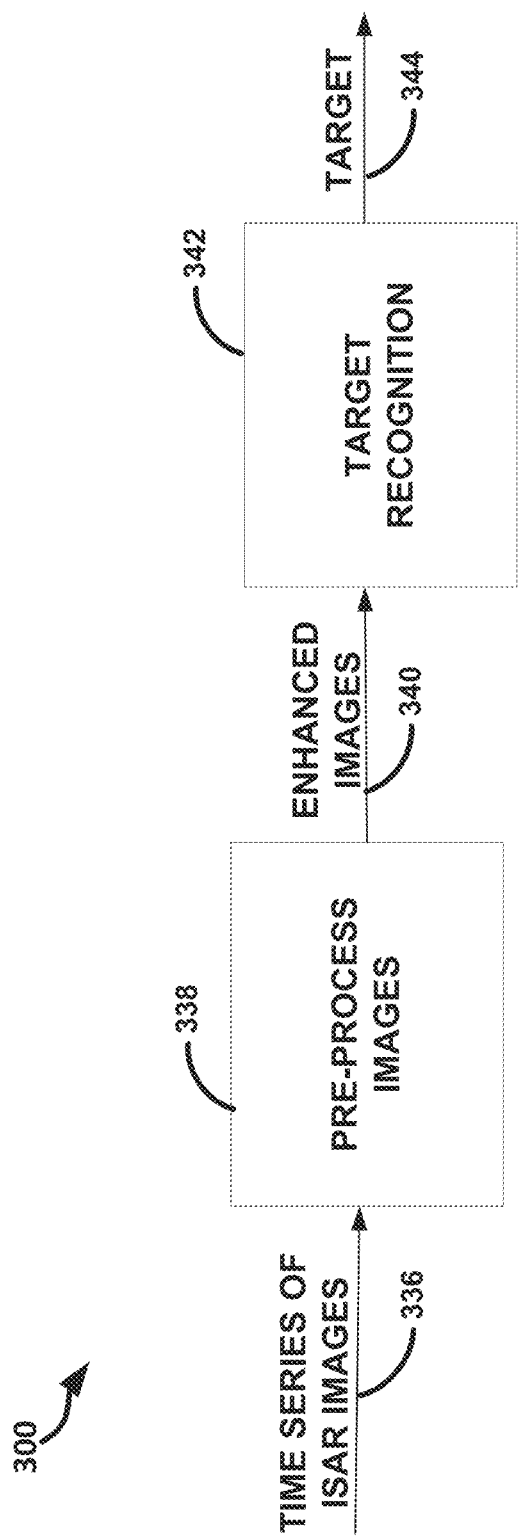
FIG. 3 illustrates, by way of example, a block diagram of an embodiment of a system for target recognition.

FIG. 3 illustrates, by way of example, a block diagram of an embodiment of a system 300 for target recognition. The system 300 includes a time series of ISAR images 336, a pre-process images operation 338 that generates enhanced images 340, and a target recognition operation 342 that generates data indicating one or more targets 344 in the enhanced image 340.

The time series of images 336 are from an ISAR. The time series of images 336 are consecutive images, in time, from the ISAR. The images 336 can be of objects that are distinguishable based on feature presence. Each of the images in the time series of images 336 can be, for example maritime objects.

At operation 338, the images 336 can be pre-processed. The operation can include image enhancement, segmenting object pixels (e.g., cropping in range), or the like. The operation 338 can be performed automatically, such as based on metadata of a given image. The operation 338 can include interpolating and re-sampling image data. The metadata can include information regarding the distance between the object and the sensor (e.g., the radar) that generated the image, an orientation of the sensor, a location of the sensor, or the like.

Figure 4:
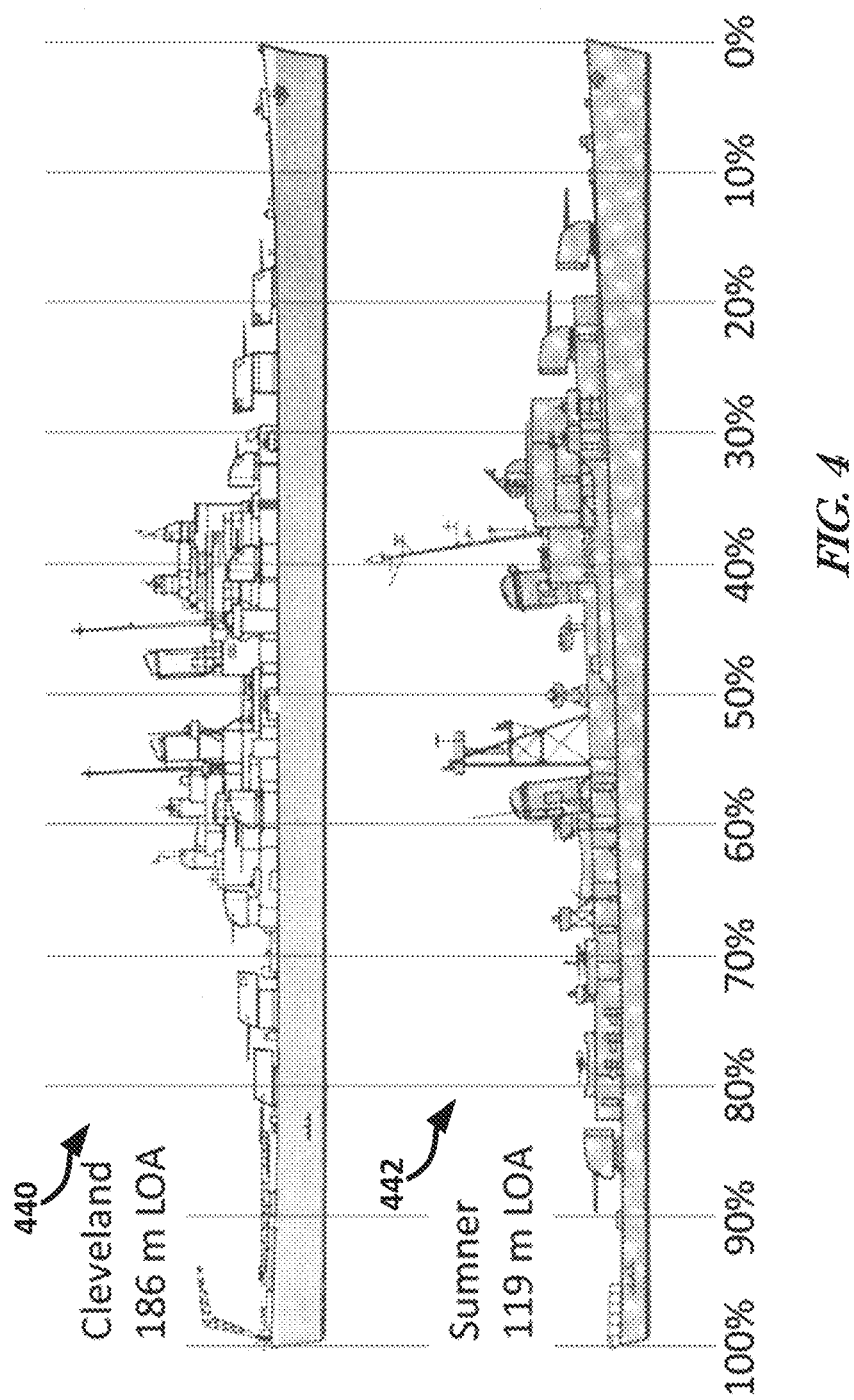
FIG. 4 illustrates, by way of example, drawings of two objects split into ten segments to aid in generating an object definition for inclusion in the object knowledge-base.
Figure 6:
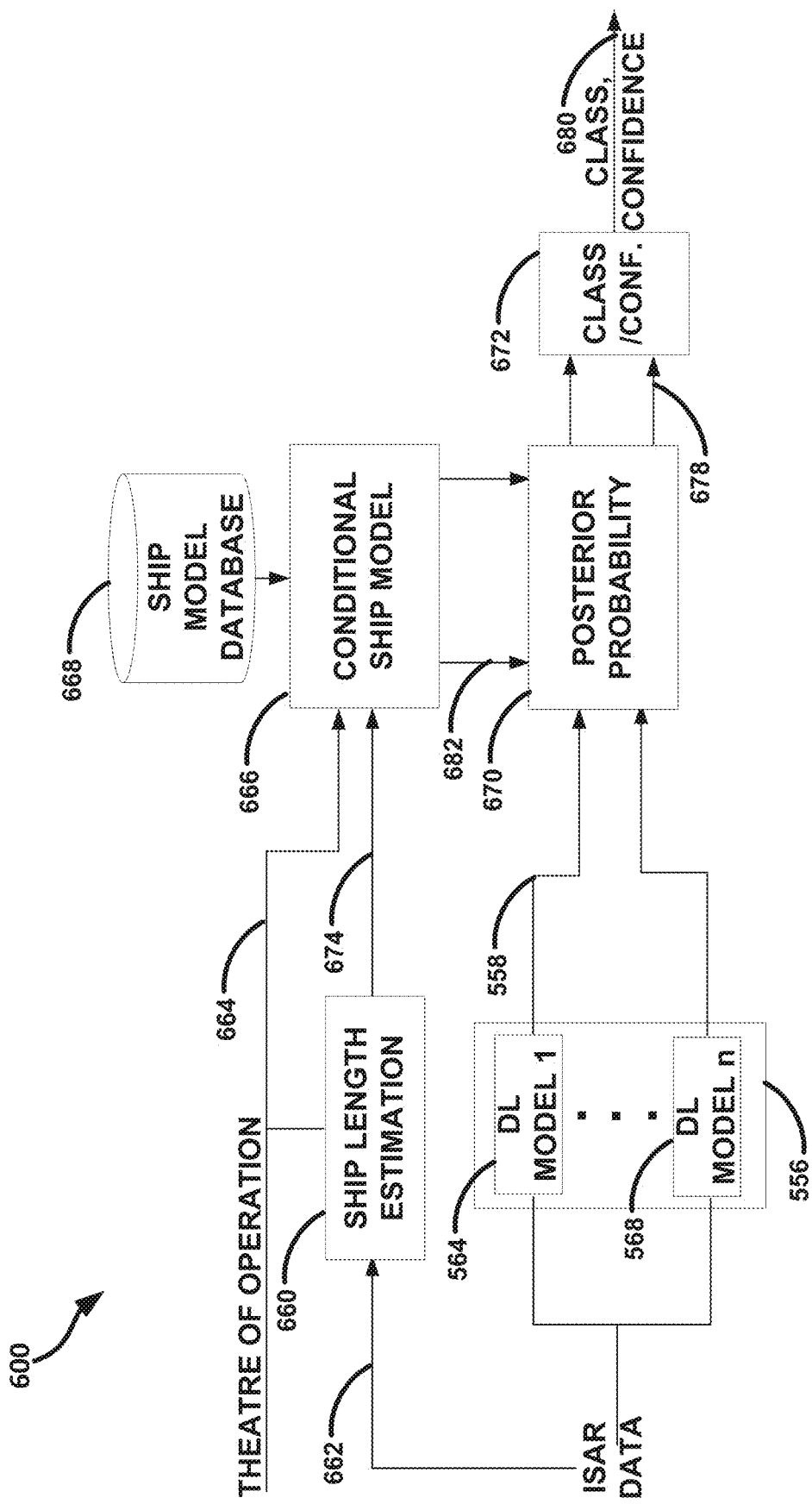
FIG. 6 illustrates, by way of example, a block diagram of an embodiment of a system for classification of an object based on discretized features along a dimension of the object.

FIG. 4 illustrates, by way of example, drawings of two objects 440, 442 split into ten segments to aid in generating an object definition for inclusion in a ship model database 668 (see FIG. 6). A human analyst can generate a definition of the object 440, 442. The definition can include respective features and their location (e.g., beginning and end) relative to a length overall (LOA) axis of the object. The objects in the example of FIG. 4 are ships but could be a different object. The features of the ships can include super-structures (SS), stacks, masts, turrets, cranes, decks, forecastles, tanks, guns, missile launchers, communications structures, radomes, funnels, rescue ships, or the like. Some of the features can include sub-types. For example, a forecastle can be short or long, a deck can be a landing deck, cargo deck, container deck, tanker deck, stern deck, etc. The features can be associated with respective approximate beginning and end locations along the LOA of the object. Example object definitions are provided in Table 1 which include only an indication of the center of an object, but can include a length of the object, a beginning and end of the object relative to the LOA or the like.

TABLE 1

EXAMPLE OBJECT DEFINITIONS

| Cleveland | Sumner |
|---|---|
| LOA = 186 m | LOA = 119 m |
| SS 40%, 2 blocks | SS 60% |
| STACKS 47%, 55% | STACKS 43%, 58% |
| MASTS 45%, 56%, POLES | MASTS 37% POLE, 55% LATTICE |
| TURRETS 20%, 25%, 33%, 60%, 67%, 75%, AND 80% | TURRETS 15%, 24%, 85% |
| CRANE 100% | CRANE NONE |
| RADAR FLASH 38% | RADAR FLASH 55% |

Instead of using these "definite" (non-probabilistic) definitions the analyst can generate a less definite definition by indicating, for each section of the ship and each high-level feature of the ship, whether the feature is present, absent, can move, or does not matter. The resulting matrix is called a ship model specification matrix herein. An example ship model specification matrix is provided:

| | Section | | | | | | | | | |
|---|---|---|---|---|---|---|---|---|---|---|
| Feat. | 1 | 2 | 3 | 4 | 5 | 6 | 7 | 8 | 9 | 10 |
| SS | 0 | 0 | 0 | 0 | 0 | 0 | 0 | 0 | 0 | 1 |
| Deck | 1 | x | x | x | x | x | x | x | x | 0 |
| Mast | 1 | 0 | 0 | 0 | 0 | 0 | 0 | 0 | 0 | 1 |
| Crane | 0 | m | m | m | m | m | m | m | m | 0 |
| Funnel | 0 | 0 | 0 | 0 | 0 | 0 | 0 | 0 | 0 | 1 |

Ship Model Specification Matrix Example, "m" indicates movable feature potentially present, "1" indicates the feature must be present, "0" indicates feature must be absent, and "x" indicates that the feature being present or absent does not affect classification of the ship.

In addition, or alternative to, specifying the ship model specification matrix manually, the ship model specification matrix can be generated automatically. The ship model specification matrix can be generated using an ensemble classifier 556 (see FIG. 5). The classifier 556 can generate data that indicates, for each physical portion of an object, whether each feature of an ensemble of features is present in the physical portion. A given "section" and "feature" of the model specification matrix can correspond to the physical portion and feature of the ensemble of features, respectively. The output of the ensemble classifier can be compared to a previously stored ship model specification stored in a database (e.g., database 668, see FIG. 6). The ship model specification can be altered based on a confidence associated with the classification of a given feature/location from the ensemble classifier. A human analyst can review the ship model specifications generated to alter, approve, discard, or the like, any changes or new ship model specifications.

An explanation of the discretized ship model (sometimes called the ship model specification matrix) is now provided using more rigorous mathematical representations.

Let s be a multi-valued random variable denoting the class of ship and S denote the set of all ship classes. Embodiments identify a set of features typically found in the class of ships of interest. These features can then be used to distinguish between different classes of ships not only by their presence/absence but also their relative location to each other along the LOA of the ship. Example of typical features may be guns, mast, radome, crane, etc. Let $n_f$ denote the number of features and $\{1, \ldots, n_f\}$ denote the set of indices associated with these features. To specify the position of the features along the length of the ship, we choose to divide the LOA of the ship into $n_l$ sections with $\{1, \ldots, n_l\}$ denoting the set of section indices.

Note that the ship sections contain no information regarding the absolute LOA of the ship. Each ship section physically scales with the length of the ship such that there are always $n_l$ features independent of the length of the ship. Since this piece of information is lost in the features, it can be modelled explicitly. The LOA of the ship can be estimated from the ISAR data d. Let p(l|d) denote the posterior distribution of the length l after having observed d. In practice, most estimators do not provide a full distribution p(l|d) but simply a point estimate $\hat{l}$ along with an uncertainty $\sigma_l^2$ (variance) associated with that estimate. If this is the case, one can model $l \sim N(\hat{l}, \sigma_l^2)$ as a normally distributed random variable with mean $\hat{l}$ and variance of $\sigma_l^2$. There are additional restrictions on l since the ship LOA is necessarily positive and there may be apriori information regarding the LOA of ships in a particular theater of operations. This can be encoded as a prior on l given as p(l|T) where T denotes the set of ships in the theater of operations. These two independent pieces of information can then be combined to obtain $$p(l \mid d, T) = \frac{p(l \mid d)p(l \mid T)}{\int_0^\infty p(l \mid d)p(l \mid T)dl} \quad (2)$$

$$= \frac{I_{[l^-,l^+]}(l)}{\sigma_l \sqrt{\pi/2} \left( \text{erf}(\tilde{l}^+) - \text{erf}(\tilde{l}^-) \right)} \exp\left(-\frac{(l-\hat{l})^2}{2\sigma_l^2}\right),$$

where the second expression assumes that p(l|T) is a uniform distribution on the interval $[l^-, l^+]$, $1_{[l^-,l^+]}(\cdot)$ is an indicator function on this set, and $$\tilde{l}^+ = \frac{l^+ - \hat{l}}{\sqrt{2}\sigma_l} \quad (3)$$

$$\tilde{l}^- = \frac{l^- - \hat{l}}{\sqrt{2}\sigma_l}. \quad (4)$$

To formulate a probabilistic model of the ship from its constituent features, embodiments can model the features as binary random variables taking values in set $\{1, 0\}$ since the features can either be present or absent. Let $f_{ij}$ denote this binary random variable signifying presence/absence of $i^{th}$ feature in a $j^{th}$ section of the ship. The ship s can be modeled by specifying an exact pattern of occurrence of some features along the length of the ship. Let $F_s$ denote the feature specification matrix for ship s. It is of size $n_f \times n_l$ where element $F_s(i,j)$ takes on values in the set $\{1, 0, x\}$ to denote whether the $i^{th}$ feature in a $j^{th}$ section of the ship is {present/absent/present or absent} respectively. The last "don't care" state is added to make the model flexible and more robust to represent variations typically present in real world ships. The "don't care" state may be used for some features that are deemed to be non-essential in certain sections of the ship and their presence or absence does not alter the underlying class of ships. This allows the flexibility to specify a ship down to minute details or open it up to be inclusive of a larger class of ships that have quite a bit of variation amongst them with only certain salient features being specified as present or absent. An example of a ship specification matrix is provided above.

Let $\chi_{sj}$ denote the set of feature indices that are "don't care" for each section j of ship s. Let $\chi_{sj}^c = \{1, \ldots, n_f\} \dagger \chi_{sj}$ denote its complement, i.e., feature indices for each section j that are not in the "don't care" state. Let $\mathcal{F} = \{f_{ij} | i \in \{1, \ldots, n_f\}, j \in \{1, \ldots, n_l\}\}$ denote the set of all the feature random variables. Let $$I_{F_s}(\mathcal{F}) = \begin{cases} 1, & f_{ij} = F_s(i, j), j \in \{1, \ldots, n_l\}, i \in \chi_{sj}^c, \\ 0, & \text{otherwise} \end{cases} \quad (5)$$

denote an indicator function for the ship specification matrix that evaluates to 1 when the feature set agrees with matrix $F_s$ at all the non-"don't care" locations and evaluates to 0 otherwise. The conditional probability of the ship given the set of features, the LOA of the ship, and the theater of operations is then defined as $$p(s \mid \mathcal{F}, l, \mathcal{T}) \propto I_s(\mathcal{T}) I_{F_s}(\mathcal{F}) \delta(l - l_s) \quad (6)$$

where $l_s$ denotes the LOA of the ship s and $1_s(\cdot)$ is an indicator function for ship s that indicates membership to the theater of operations. The conditional probability of the ship having observed the data is obtained by marginalizing the joint ship and length distribution over all lengths $$p(s \mid \mathcal{F}, d, \mathcal{T}) = \int_0^\infty p(s, l \mid \mathcal{F}, d, \mathcal{T}) dl \quad (7)$$

$$= \int_0^\infty p(s \mid \mathcal{F}, l, \mathcal{T}) p(l \mid d, \mathcal{T}) dl$$

$$\propto \int_0^\infty I_s(\mathcal{T}) I_{F_s}(\mathcal{F}) \delta(l - l_s) p(l \mid d, \mathcal{T}) dl$$

$$= \frac{1}{z} I_s(\mathcal{T}) I_{F_s}(\mathcal{F}) p(l_s \mid d, \mathcal{T}),$$

where the second expression assumes that the feature set $\mathcal{F}$ and a length l are a sufficient statistic for the ship s, (p(s| $\mathcal{F}$, l, $\mathcal{T}$)=p(s|$\mathcal{F}$, l, d, $\mathcal{T}$)) and the length l is independent of the feature set F given the data (p(l|d, $\mathcal{T}$)=p(l|F, d, $\mathcal{T}$)). z is a normalization constant that can be computed as $$z = \sum_{s \in S \cap \mathcal{T}} I_{F_s}(\mathcal{F}) p(l_s \mid d, \mathcal{T}). \quad (8)$$

For the distribution to be valid, z≠0, so the quantities F and d are chosen such that at least one of the ships in the set S∩$\mathcal{T}$ evaluates to a non-zero probability.

For each of the $n_f$ features, embodiments can use a trained DL model to detect the presence/absence of the feature in the input data. The data can be chunked into overlapping chips that span the entire length of the ship. The CNNs can operate on each of the chips and their output can be binned into $n_j$ sections. For each ship section $j \in \{1, \ldots, n_j\}$, the $i^{th}$ feature DL model outputs a probability of the feature i being present in that section, i.e., $p(f_{ij}=1/d)$. Given the normalized output, the probability of the feature being absent is given as $p(f_{ij}=0|d)=1-p(f_{ij}=1|d)$.

Each DL model discriminates a single feature independent of the other DL models. Embodiments can combine the output of the DL models to infer a joint distribution of the features. However, the features are not independent since some combination of features are more plausible than others in the real world. The assumption of the data being independent given the features is easier to justify as shown below. Therefore, one can convert $p(f_{ij}|d)$ to $p(d|f_{ij})$. By Bayes rule $p(f_{ij}|d) \propto p(d|f_{ij})p(f_{ij})$. If $p(f_{ij}=1)=p(f_{ij}=0)=0.5$, then $$p(d|f_{ij}) \propto p(f_{ij}|d). \quad (9)$$

The prior $p(f_{ij})$ can be controlled in the DL model training process by either presenting the DL model equal number of "feature present" and "feature absent" samples or appropriately weighing the cost of mis-classification when the number of present and absent samples are unbalanced. Given eq. (9), set $$\tilde{p}(d|f_{ij})=p(f_{ij}|d), \quad (10)$$

where $\tilde{p}(\cdot)$ denotes likelihoods and distinguishes them from probabilities $p(\cdot)$ that are required to sum to 1 over the sample space of their arguments. In this instance, $\Sigma_d p(d|f_{ij})=1$ whereas $\Sigma_d \tilde{p}(d|f_{ij}) \neq 1$. Note that data likelihoods can be normalized such that $$\sum_{f_{ij}} \tilde{p}(d|f_{ij}) = \sum_{f_{ij}} p(f_{ij}|d) = 1. \quad (11)$$

The data likelihood given all the features is $$\tilde{p}(d|\mathcal{F}) = \prod_{j=1}^{n_j} \tilde{p}(d|\{f_{ij} | i \in \{1, \ldots, n_f\}\}) \quad (12)$$

$$= \prod_{j=1}^{n_j} \prod_{i=1}^{n_f} \tilde{p}(d|f_{ij}),$$

where the first simplification comes from assuming that the data is conditionally independent given the features across the different ship sections and the second one assumes that the data is conditionally independent within the group of features in each section. The first assumption is easier to justify since different portions of the data are used for different sections of the ship although there may be some overlap. The second assumption is harder to justify. It most likely holds for features that are of very different sizes as different portions of the data will be accessed to make the determination. It may also hold when the features look very different and the information extraction from the data may be somewhat orthogonal. These properties will be true in general for a large number of features. However, for a small minority of features where this assumption fails, one can optionally train the DL models to output the joint probability of the small subset of features given the data. The number of output values from the DL models now becomes $2^n-1$, where n is the cardinality of the subset of dependent features. For small n this is still manageable but does increase the requirement for training data as now all combinations of feature present/absent in the set need to be supplied. The subsequent results assume independence but the expressions can be easily modified to accept joint feature probabilities on arbitrary subsets. The joint posterior probability of the features given the data is obtained by using Bayes rule and eq. (12).

$$p(\mathcal{F}|d) = \frac{p(d|\mathcal{F})p(\mathcal{F})}{\sum_{\mathcal{F}} p(d|\mathcal{F})p(\mathcal{F})} \quad (13)$$

$$= \frac{p(\mathcal{F}) \prod_{j=1}^{n_j} \prod_{i=1}^{n_f} \tilde{p}(d|f_{ij})}{\sum_{\mathcal{F}} p(\mathcal{F}) \prod_{j=1}^{n_j} \prod_{i=1}^{n_f} \tilde{p}(d|f_{ij})}$$

$$= \frac{1}{z'} p(\mathcal{F}) \prod_{j=1}^{n_j} \prod_{i=1}^{n_f} \tilde{p}(d|f_{ij})$$

where z' is a normalization scalar. Note that the sample space of all features can be relatively large; there are $2^{n_f n_j}$ possible combinations. If the ship was divided into $n_j=10$ sections and there are $n_f=17$ features, the number of possible combinations is 1.4966e+51! The specification of the a priori joint feature probability, $p(\mathcal{F})$, and the computation of the normalization scalar z are both intractable.

However, imposing a prior that favors certain feature combinations over others can be detrimental since the feature model will later be operating along with the ship model and it can be beneficial for the ship model to dictate which feature combinations are plausible and occur more abundantly than others. With this in mind, it is safe to set p(F) to be the non-informative prior $$p(\mathcal{F})=\text{constant} \quad (14)$$

weighing all feature combinations equally. For the non-informative prior, the normalization z' can be computed as follows $$z' = \sum_{\mathcal{F}} \prod_{j=1}^{n_j} \prod_{i=1}^{n_f} \tilde{p}(d|f_{ij}) \quad (15)$$

$$= \prod_{j=1}^{n_j} \prod_{i=1}^{n_f} \sum_{f_{ij}=\{1,0\}} p(f_{ij}|d)$$

$$= 1,$$

With this simplification, the joint posterior probability of the features given the data is obtained as $$p(\mathcal{F}|d) = \prod_{j=1}^{n_j} \prod_{i=1}^{n_f} \tilde{p}(d|f_{ij}), \quad (16)$$

which is essentially the likelihood of the data given the features. Note that the result is only valid when all possible feature combinations are equally valid.

It is possible that the feature set used for the ship definition matrix $F_s$ may differ from the feature set discriminated by the DL model. In one scenario, the feature set discriminated by the DL model may divide categories of features into finer subsets. For example, the category of cranes found on ships may be subdivided into "jib crane", "gantry crane beam", "gantry crane cross beam", "gantry crane double", or the like. However, the ship model definition may choose to just use the broad category of "crane" for all these different types of cranes since the model is elicited from user knowledge and the reduction in feature complexity may be beneficial from a simplicity perspective. In this case, a mapping is required between the DL model discriminated features and the features used for the ship model.

In the following treatment, it is assumed that the ship model definition uses coarse classes of features and the DL model discriminates a finer set of features than the ship model features. Let $\{\tilde{f}_{ij}|i\in\{1,\ldots,\tilde{n}_f\}, j\in\{1,\ldots,n_l\}\}$ denote the set of features discriminated by the DL model, where $\tilde{f}_{ij}$ denotes the binary random variables corresponding to each feature and $\tilde{n}_f$ denotes the number of discriminated features. For each feature, the DL model outputs the posterior probability, $p(\tilde{f}_{kj}|d)$, of the feature being present/absent. These outputs can be converted to $p(f_{ij}|d)$, which gives the probability of ship model feature being present/absent.

To facilitate this conversion, one can map between the two feature sets. For each feature i in the ship model definition, let $H_i$ denote the set of indices of the features discriminated by the DL model that falls in the super class i. The super class feature i is considered to be present when any feature in the set $H_i$ is present. Using this definition $$p(f_{ij}|d) = \begin{cases} 1 - \prod_{k\in\mathcal{H}_i} p(\tilde{f}_{kj} = 0 | d), & f_{ij} = 1 \\ \prod_{k\in\mathcal{H}_i} p(\tilde{f}_{kj} = 0 | d), & f_{ij} = 0 \end{cases} \quad (17)$$

Note that the mapping given by eq. (17) is not restricted to the case where the CNN features set is being reduced to a smaller set of super classes. It may be applied in the other direction where the DL model discriminates a smaller subset than is required by the ship model definition. However, from a computation perspective, it makes no sense to increase the set of features without actually detecting them in the underlying data; the amount of information gained remains the same in the expanded data set.

The physical process of data acquisition takes place in the forward sense where the data acquired depends on what object is being viewed by the sensor. The ship classification problem represents the inverse process where having acquired data, we are tasked with finding out what object may have plausibly generated the acquired data. The probabilistic models formulated previously allows one to solve this inverse problem as we show next. We choose the maximum a posteriori estimator (MAP) to classify the ship. This is a good choice given the known optimality properties of the MAP estimate.

The posterior probability of the ship having observed the data is given as $$p(s|d,\mathcal{T}) = \sum_{\mathcal{F}} p(s, \mathcal{F} | d, \mathcal{T}) \quad (18)$$

$$= \sum_{\mathcal{F}} \underbrace{p(s|\mathcal{F},d,\mathcal{T})}_{\text{ship model}} \underbrace{p(\mathcal{F}|d)}_{\text{feature model}},$$

where the first expression is obtained by introducing the features and marginalizing over them and the second expression is obtained by employing the chain rule and assuming that the features are independent of the theater of operations given the data ($p(\mathcal{F}|d) = p(\mathcal{F}|d, \mathcal{T})$). Eq. (18) can be simplified to $$p(s|d,\mathcal{T}) \leq \frac{1}{2} \tilde{p}(s|d,\mathcal{T}), \quad (19)$$

where the ship likelihood is given as $$\tilde{p}(s|d,\mathcal{T}) = I_s(\mathcal{T}) p(l_s|d,\mathcal{T}) \prod_{j=1}^{n_l} \prod_{i \in \mathcal{X}_{sj}^c} \tilde{p}(d|f_{ij} = F_s(i,j)). \quad (20)$$

This result is quite intuitive. Essentially, the posterior probability of a ship is proportional to probability of the length of the ship given the data and the joint probability of the features occurring in the same pattern as the ship specification matrix excluding all features that are "don't care".

The normalization constant can simply be computed as $$z = \sum_{s \in S \cap \mathcal{T}} \tilde{p}(s|d,\mathcal{T}) = \sum_{s \in S \cap \mathcal{T}} p(l_s|d,\mathcal{T}) \prod_{j=1}^{n_l} \prod_{i \in \mathcal{X}_{sj}^c} \tilde{p}(d|f_{ij} = F_s(i,j)). \quad (21)$$

Note that in order to have a valid posterior distribution of the ship, the normalization constant $z \neq 0$. Theoretically, this is ensured by the conditioning on $\mathcal{T}$, i.e. the observed ship has to be in the set $S \cap \mathcal{T}$ so at least one of the ships under consideration should evaluate to a non-zero probability. However, in practice, the restriction of the sample space of the features to those combinations that occur in the ship database may be problematic especially if the database is not up to date or inaccurate and does not fully represent the ships that are acquired by sensor. This issue is addressed elsewhere.

The MAP estimate for the ship, $\hat{s}$, is given as $$\hat{s} = \quad (22)$$

$$\operatorname*{argmax}_{s \in S} p(s|d,\mathcal{T}) = \arg \max_{s \in S \cap \mathcal{T}} p(l_s|d,\mathcal{T}) \prod_{j=1}^{n_l} \prod_{i \in \mathcal{X}_{sj}^c} \tilde{p}(d|f_{ij} = F_s(i,j)).$$

Note that the MAP estimator can be regarded as a hard classifier that returns a single best class given the data. The confidence associated with this decision is $p(\hat{s}|d, \mathcal{T})$. However, the posterior probabilities for all ships, $p(s|d, \mathcal{T})$, $s \in S \cap \mathcal{T}$, are still available and can be regarded as a soft classifier giving a rank order list of the most likely ship classes. FIG. 6 shows a high-level block diagram of the data flow involved in the MAP classification and uncertainty estimation.

Figure 5:
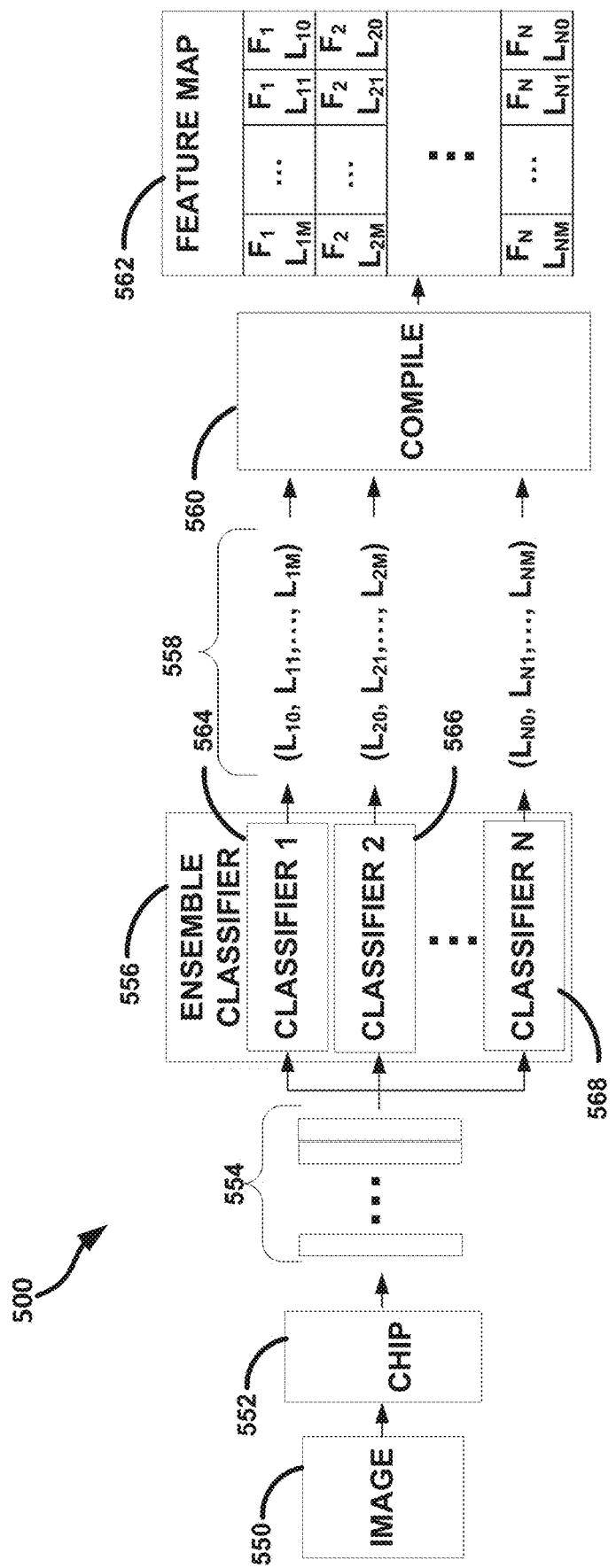
FIG. 5 illustrates, by way of example, a block diagram of an embodiment of a system for feature map generation.

FIG. 5 illustrates, by way of example, a block diagram of an embodiment of a system 500 for feature map generation such as can be used at 558. The system 500 as illustrated includes an image 550 as input and a feature map 562 as an output. The system 500 includes a chip operation 552 that provides image chips 554 as input to an ensemble classifier 556. Each classifier 564, 566, 568 of the ensemble classifier 556 generates likelihood vectors, jointly labeled as likelihood vectors 558 in FIG. 5. The likelihood vectors 558 are operated on by a compile operation 560 to generate the feature map 562. The feature map 562 indicates, for a given location along the LOA axis of the object in the image 550, a likelihood of each of the features classified by the ensemble classifier 556.

The image 550 can be from the images 336 or more directly from a device that captured the image 550. The image chips 554 generated by the chip operation 552 can each be of a same or different extent column-wise or row-wise. If the image 550 is an ISAR image, the column-wise extent can be a full Doppler extent and the row-wise extent can be a proper subset of the range. The chips 554 can each provide a view of a proper subset of the image 550. The chips 554, when combined, can provide a view of the entire image 550. A sliding window can be moved across the image 550 to generate the image chips 554. The sliding window can generate image chips 554 that overlap a specified number of columns between immediately adjacent image chips. The overlap between immediately adjacent image chips 554 can be zero columns, up to the number of columns minus one.

The ensemble classifier 556 can implement classifiers 564, 566, 568 that are ML models. The classifiers 564, 566, 568 can each be trained to discriminate whether a different feature of the object is in the image 550. Considering the example object of a ship, the classifier 564 can be trained to discriminate a mast, the classifier 566 can be trained to discriminate a deck, and the classifier 568 can be trained to discriminate a turret, for example. Each of the classifiers of the ensemble classifier 556 can be trained using manually or automatically labelled images or image segments (sometimes called image chips).

The image chips 554 may not be guaranteed to provide a view of an entire extent of a feature. If an image segment includes data indicating the amount of the segment that the feature spans in the image chip (in terms of number of columns spanned) is greater than a threshold amount (e.g., 10%, 20%, 30%, 33%, 35%, 40%, 50%, or an amount therebetween) or data indicating the amount of the feature shown in the segment (in terms of overall extent of the feature) is greater than a threshold amount (e.g., 25%, 30%, 33%, 40% 50%, 60%, 70%, 75%, 80%, 90%, 100%, or some amount therebetween) associated therewith, that image segment can be used for training or testing of the classifier 564, 566, 568. Training the classifier 564, 566, 568 in this manner can help the classifier 564, 566, 568 identify a feature that is not fully depicted in any of the image chips 554.

Each classifier 564, 566, 568 of the ensemble classifier 556 can produce a vector of likelihoods, jointly labelled as likelihoods 558 in FIG. 5. The likelihoods can indicate, for each feature and each image chip, a likelihood of that feature being present in the image chip. If there are M image chips and N features, there can be M×N likelihoods generated and provided to the compile operation 560. The likelihoods 558 represents soft classification of the presence/absence of the features.

The compile operation 560 can generate the feature map 562. The feature map 562 can indicate different extents of the LOA axis of the object in the image 550 along columns and different features along rows thereof. The feature map 562 can be formed of cells. Each cell of the cells can represent a location along the LOA axis and a feature of the features at that location along the LOA axis.

FIG. 6 illustrates, by way of example, a block diagram of an embodiment of a system 600 for classification of an object based on discretized features along a dimension of the object. The system 600 includes operations 660, 666, 670, and 672 and a ship model database 668.

The ensemble classifier 556 can operate on the data d at 662 to determine soft classifications for image chips of the data at 662. The output of the ensemble classifier 556 at 558 can be in the form of $\tilde{p}(d|f_{ij})$, $\forall j$.

The ship model database 668 retains the ship specification matrices. The conditional ship model operation 666 receives the theatre of operation, $\mathcal{T}$, at 664 and a ship length estimate, l, in probability form as p(l|d, $\mathcal{T}$) at 674. The ship length estimation operation 660 determines the ship length. The operation 666 can produce conditional ship models that are probabilities of the ship associated with a given ship specification matrix being associated with the data, d, given the ship length estimate at 674 and the theater of operation at 664. The conditional ship models at 682 can take the form $p(s_n| \mathcal{F}, d, \mathcal{T})$. The operation 670 can operate based on the soft classifications at 558 and the conditional ship models at 682 to determine a posterior probability at 678. The posterior probability at 678 can take the form $p(s_n|d, \mathcal{T})$. The operation 672 can operate based on the posterior probability at 678 to determine a classification and confidence at 680. The operation is described in more detail regarding FIG. 7 and elsewhere.

The operation 660 can include estimating the length overall (LOA) axis of the object in the image based on measured characteristics of the object based on d at 662, the ISAR or other image data. The LOA axis can be estimated based on an aspect angle of the image. In other instances where the target object has been tracked, the operation 660 may compute the aspect angle from track information and telemetry information from the ship using conventional methods that are well known. The aspect angle information combined with the apparent length information gleaned from the image may be used to compute a true length. Based on the apparent length and aspect angle, the operation 660 can calculate a true length of the object. For example, if the apparent length is 86 meters and the aspect angle is 55 degrees, then the calculated true length of the object can be 150 meters. Note that the true length can be corrected using model-based data in a post-processing step that occurs after a known object has been classified.

The normalization constant z in eq. (21) distributes the probability mass to sum to one across all the ships in the database 668. But what happens if the ship that is being observed is not represented in the database? In this case, the likelihood of all the ships in the database will be tiny and a high confidence assigned to any ship by the MAP estimator would be misleading. In essence, the system 600 is forced to choose amongst a list of options that are all about equally bad and the category that the MAP estimator chooses will be prone to noise and unstable due to ratio of tiny numbers. To guard against this scenario, embodiments can introduce another category of ships called "unknown" to the existing set of ships, S. There is no ship specification matrix for this class but it is meant to include all feature combinations that are presently absent in the database but form a valid combination that could be observed in the world. A user can assign a fixed likelihood to all these feature combinations. The unknown category is a catch all category. Thus, the category can be specified in broad strokes without delving into the specifics. If the observed data is such that the likelihood of the database ships are all tiny, then the likelihood of this catch all category dominates and all the probability mass automatically flows to it.

So how is one supposed to figure out the likelihood to assign to this catch all category? If the likelihood assigned to this class is made too small, it will stop doing its job. On the other hand, if the assigned likelihood is large relative to other good matches, this category will hog more than its fair share of the probability mass in the final assignment. Note that the ship likelihoods are not normalized so the absolute value can scale with the number ships sections and number of non-"don't care" features; it is only their relative magnitudes that matter as far the ship classification goes. To make sure the likelihood assigned to the catch all class scales appropriately, the likelihood of the unknown class is defined as $$\tilde{p}(s=\text{"unknown"}|d)=\tilde{p}(s_0)=p_\epsilon^{\bar{n}+1}, \quad (23)$$

where $s_0$ denotes the unknown class, $\bar{n}$, denotes the average number of non-"don't care" features in the ship specification matrices contained in the database 668, and $p_\epsilon$ is a small probability value (something like 0.1) that we think the features should match with at the very least for the full feature set to be considered as present in the database. Note that a 1 is added to the exponent to account for the ship length likelihood. A test sample d registering a ship likelihood $\tilde{p}(s|d)$ smaller than $\tilde{p}(s_0)$ for all ships will be considered not present in the database by the MAP estimator as the posterior probability of the catch all class will be larger.

Figure 7:
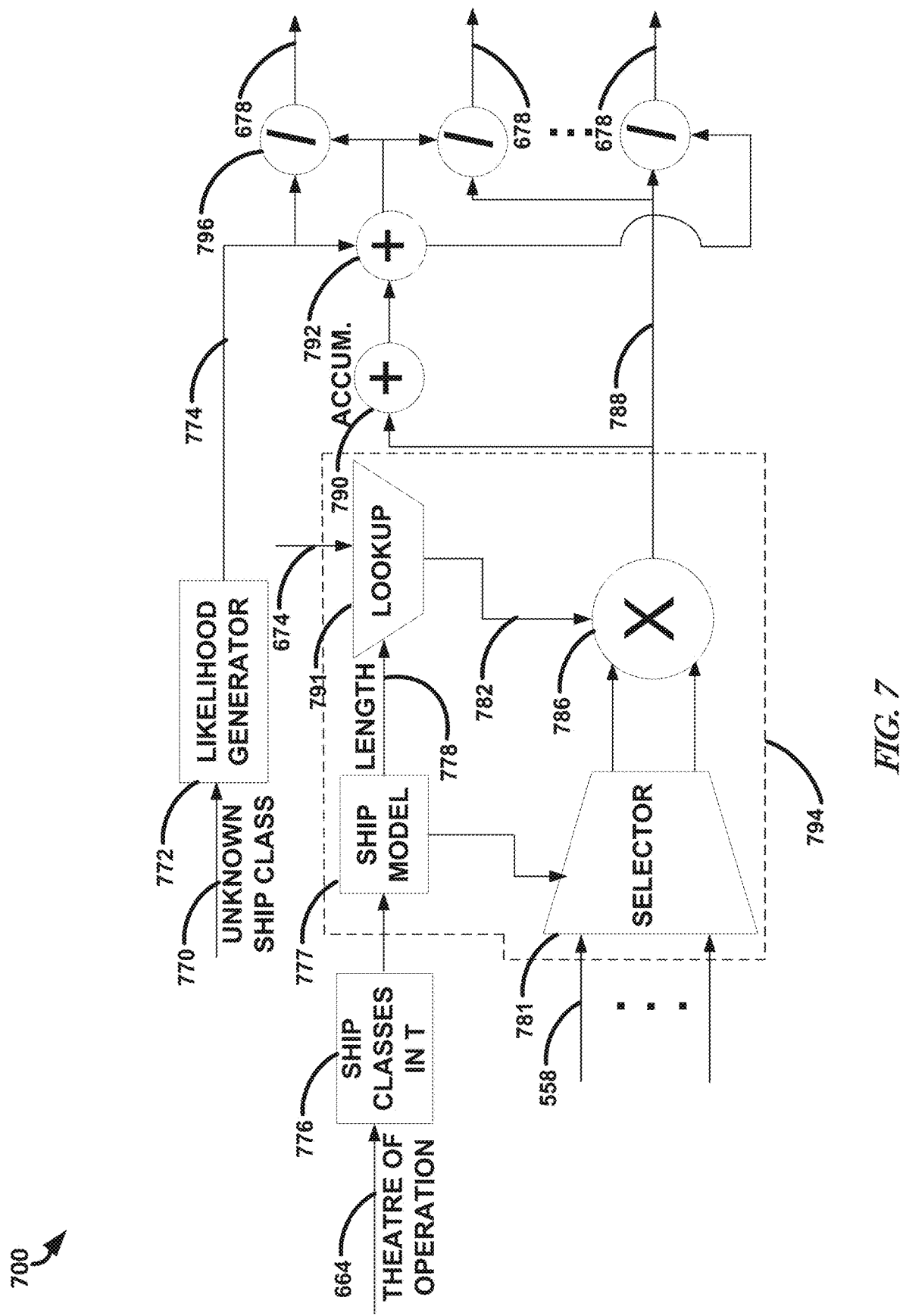
FIG. 7 illustrates, by way of example, a diagram of an embodiment of a system that includes portions of the system of FIG. 6, that shows the detailed data flow for the ship posterior probability computation.

FIG. 7 illustrates, by way of example, a diagram of an embodiment of a system 700 that includes portions of the system 600, that operates for the ship posterior probability computation. The computation for each ship is identical and can be performed in parallel. A "ship iterator" block 794 is a loop over all ships in the theater of operations 664. An accumulator 790 keeps a running sum of the all the ship likelihoods. After the loop is complete, the ship likelihoods are normalized, at operation 796, by the accumulated sum and a likelihood 774 of the unknown ship 770 generated at operation 772.

After the MAP estimator picks the catch all category, there is an opportunity for the user to add the observed ship to the database 668. The feature profiles discriminated by the DL models 556 can be used as a template for the ship specification matrix. The data from the DL models 556 are likely to be noisy so the profiles can be cleaned up with user supervision. The underlying ISAR data can also be examined to determine if the DL models 556 correctly identified the features or if there were errors in the discriminated feature profiles. Depending on the results of this examination using expert domain knowledge, a class can be assigned to the observed ship and ship membership in the hierarchical taxonomy can be updated. This continuous update process makes the database 668 grow over time and the classifier adapt to the theater of operations 664.

The system 700 as illustrated includes ship classes in a theater of operation 776, the ship specification matrix 777, a selector 781, a multiplier 786, a likelihood generator 772, an accumulator 790, a combiner 792, and a normalizer 796. Many of the components of the system 700 operate in concert to perform the operations treated more formally using mathematical notation herein.

The ship classes in the theatre of operation 776 can include only those ships that are categorized into classes of concern for a given scenario. This reduces the number of possible ship specification matrices 777 that are considered by the iteration block 794. The ship classes can be specified in a hierarchy of ship classes (see FIG. 8 for example).

A length 778 of the ship can be determined from the ship model 777. The lookup operation 791 can compare the length 778 to a length provided by a length estimator 660. The lookup operation 791 can determine how different the length 778 is from the length 674 and whether the lengths 674, 778 are within the error bounds of one another. A corresponding probability 782 can be determined based on the lengths 674, 778.

The selector 781 can iterate through features 558 discriminated in the image by the ensemble classifier 556 and select the feature likelihoods based on the ship specification matrix obtained from the ship model 777. A multiplier 786 can take the product of all the selected feature likelihoods and the and the length probability 782. The adjusted features likelihoods 788 can be accumulated by the accumulator 790 and normalized by a normalizer 796.

The likelihood generator 772 can compute a likelihood 774 based on a user selected minimum likelihood threshold for each feature.

The accumulator 792 sums up the likelihoods 788 of all the ships in the theatre of operation 664 and the likelihood of the unknown class 774. The normalizer 796 can normalize the likelihoods such that they sum to a constant (e.g., one (1), or another constant) and convert them into probabilities.

Figure 8:
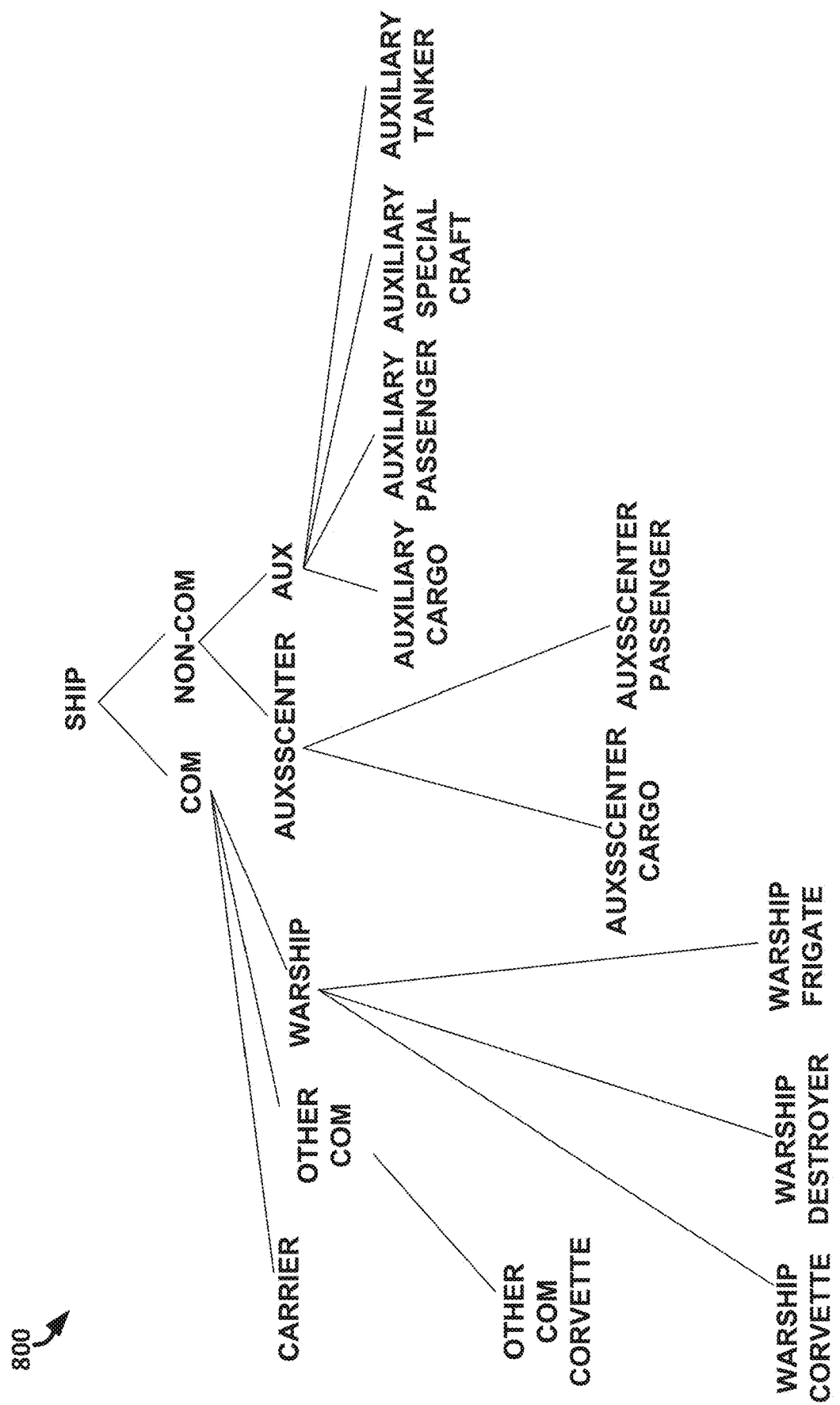
FIG. 8 illustrates, by way of example, a diagram of an embodiment of a taxonomy of ships arranged in a hierarchical fashion.

FIG. 8 illustrates, by way of example, a diagram of an embodiment of a taxonomy of ships arranged in a hierarchical fashion with the higher levels being a coarse sub-division of the ships into broad categories of "Combatant" and "Non-Combatant" and the lower levels sub-dividing each of the coarse categories into finer classes. Such a hierarchical classification system is useful for fusing information from different ATRs operating on raw data with varying levels of resolution. ATRs working on low resolution data will only be able to categorize objects in the higher levels of the tree whereas ATRs operating on higher resolution data will be able to go lower in the classification. The probabilistic framework we have formulated allows easier computation of the posterior probability of any node in the taxonomy after computation of the posterior probability of each of the ships.

In the subsequent treatment, the explicit conditioning on $\mathcal{T}$ from our derivations in the interest of notational simplicity. The effect of conditioning on $\mathcal{T}$ simply manifests as the restriction of the ships to the subset $S \cap \mathcal{T}$ there is no loss of generality in the final expressions.

For each node $n_g$ in the taxonomy graph (e.g., the graph 800), let $S_{n_g}$ denote the set of ships assigned to that node. Then the posterior probability of any node in the taxonomy is given as $$p(n_g | d) = \sum_{s \in S \cap S_{n_g}} p(s | d) \quad (24)$$

The hierarchical taxonomy shown in FIG. 8 can be used to perform the classification of a target.

The MAP estimator can operate in a very high dimensional feature space making visualization of the data difficult for human consumption. This is a big impediment in understanding what is going on and instilling confidence for human operators. Furthermore, the posterior probability computed above gives a measure of confidence associated with the decision but it does not inform the uncertainty associated with the estimated confidence. The gradient field of the posterior probability with respect to the set of features can be used as a solution to both the visualization and uncertainty estimation problem.

The magnitude of the gradient controls how sensitive the posterior probability of the class will be to input feature values. If the variability of the DL models 556 is known, one can use the magnitude of the gradient to predict the variability of the confidence attached to each class, which can serve as the uncertainty of the prediction.

The derivative of ship likelihood can be facilitated by going to the logarithmic domain. Taking the log of eq. (20)

$$\log \tilde{p}(s \mid d) = \sum_{j=1}^{n_i} \sum_{i \in \mathcal{X}_{sj}^c} \log \tilde{p}(d \mid f_{ij} = F_s(i,j)) + \log p(l_s \mid d, \mathcal{T}). \quad (25)$$

Let $p_{ij} = p(f_{ij} = 1 \mid d) = \tilde{p}(d \mid f_{ij} = 1)$ denote the DL model 556 outputs. Taking the derivative of eq. (25) with respect to $p_{ij}$ and simplifying $$\frac{\partial \log \tilde{p}(s \mid d)}{\partial p_{ij}} = \frac{(-1)^{1-F_s(i,j)} I_{\mathcal{X}_{sj}^c}(i)}{\tilde{p}(d \mid f_{ij} = F_s(i,j))} \quad (26)$$

$$\frac{\partial \tilde{p}(s \mid d)}{\partial p_{ij}} = \frac{S_{\mathcal{X}_{sj}^c}(i, F_s(i,j))}{\tilde{p}(d \mid f_{ij} = F_s(i,j))} \tilde{p}(s \mid d)$$

where $I_X(\cdot)$ denotes the indicator function for the set X and $S_X(\cdot,\cdot)$ is a combined indicator and sign function defined as $$S_X(i,v) = \begin{cases} 1, & i \in X, v = 1 \\ -1, & i \in X, v = 0 \\ 0, & \text{otherwise} \end{cases} \quad (27)$$

Taking the derivative of eq. (19), the derivative of the posterior probability with respect to the DL model discriminations is obtained $$\frac{\partial p(s \mid d)}{\partial p_{ij}} = \frac{1}{z}\left(\frac{\partial \tilde{p}(s \mid d)}{\partial p_{ij}} - p(s \mid d) \sum_{r \in S} \frac{\partial \tilde{p}(r \mid d)}{\partial p_{ij}}\right). \quad (28)$$

Substituting eq. (26) in eq. (28)

$$\frac{\partial p(s \mid d)}{\partial p_{ij}} = \frac{S_{\mathcal{X}_{sj}^c}(i, F_s(i,j))}{\tilde{p}(d \mid f_{ij} = F_s(i,j))} p(s \mid d) - \quad (29)$$

$$p(s \mid d) \sum_{r \in S} \frac{S_{\mathcal{X}_{rj}^c}(i, F_r(i,j))}{\tilde{p}(d \mid f_{ij} = F_r(i,j))} p(r \mid d)$$

$$= m_{sij} - p(s \mid d) \sum_{r \in S} m_{rij}$$

where $$m_{sij} = S_{\mathcal{X}_{sj}^c}(i, F_s(i,j)) \frac{p(s \mid d)}{p(f_{ij} = F_s(i,j) \mid d)} \quad (30)$$

is a signed multiplier of the $p_{ij}$ contribution to the posterior probability $p(s \mid d)$. The first term in eq. (29) gives the direct effect $p_{ij}$ has on the posterior probability of ship s and the second term gives the indirect suppression effect due to normalization of the posterior probability and sums up the $p_{ij}$ contribution to all the ships. Eq. (29) can be alternatively derived by using the chain rule $$\frac{\partial p(s \mid d)}{\partial p_{ij}} = \sum_{r \in S} \frac{\partial p(s \mid d)}{\partial \tilde{p}(r \mid d)} \frac{\partial \tilde{p}(r \mid d)}{\partial p_{ij}} \text{ where} \quad (31)$$

$$\frac{\partial p(s \mid d)}{\partial \tilde{p}(r \mid d)} = \frac{1}{z}(\delta(r-s) - p(s \mid d)). \quad (32)$$

Equations (31) and (32) are more useful for a modular implementation that back propagates the derivatives through the normalization and the likelihood computation modules. As was discussed above, one can use the gradient to put an error bar on the confidence for ship s. Let $\sigma_s$ denote the expected variation (standard deviation) on reported confidence $p(s \mid d)$ for ship s and let $\sigma_{ij}$ denote the expected variation on the DL model output for cell (i,j). Then assuming the noise in the DL model output is independent across the cells (diagonal covariance matrix)

$$\sigma_s = \sqrt{\sum_{ij}\left(\frac{\partial p(s \mid d)}{\partial p_{ij}}\right)^2 \sigma_{ij}^2} \quad (33)$$

$$\approx \left(\max_{ij} \frac{\partial p(s \mid d)}{\partial p_{ij}}\right) \sigma, \quad (34)$$

where $\sigma$ denotes the overall variation in the DL model output averaged across all cells and the approximation holds when the sensitivity of a single cell dominates. The standard deviation $\sigma_s$ is an indicator of how reliable the estimate of the confidence is for the MAP estimate. A small value means the estimated confidence is reliable and the sample lies deep in the MAP assigned category. A large value is indicative of the sample close to the MAP boundary and conveys the decision will be easier to flip if the features values change by a small amount.

After a MAP estimate is computed, a human operator may be interested in understanding how the decision was arrived at and what feature in the ship model or the underlying data was the determining factor. Such an understanding bolsters confidence in the decision and gives the human operator an opportunity to review the underlying ISAR data and override decisions of the DL model, such as if they believe it to be in error.

To show which features were the most discriminative between the ship classes, the gradient field can be displayed $$g_s(i,j) = \frac{\partial p(s \mid d)}{\partial p_{ij}} \quad (35)$$

to the operator for any ship s they may be interested in. Typically, this would be displayed for the MAP class $\hat{s}$ and any other class that is close in confidence to the MAP class to show how the decision may be flipped to the competing class. The sign of the gradient field $g_s(\cdot,\cdot)$ is indicative of whether the feature should be present or absent to bolster the class confidence. Positive values signal the feature needs to be present whereas negative values signal the feature needs to be absent. A value of zero indicates the feature has no discriminative value for the classes under consideration. Note that the set of features that need to be present/absent and those that are non-discriminative changes as the ship classes that we are trying to discriminate between changes. So as the theater of operations changes, these feature sets will change. Also, since $g_s(\cdot,\cdot)$ is a local derivative, it represents the incremental changes that can be made to the current state of the DL model data to increase/decrease class probabilities. A large magnitude means that the classification is very sensitive to the presence/absence of the feature whereas values near zero have little effect on the final decision. Note the gradient field has the property $$\sum_{s \in S} g_s(\cdot, \cdot) \equiv 0, \tag{36}$$

which follows from the fact that the posterior probability of the ships sum to 1 over the sample space of ships.

Figure 9:
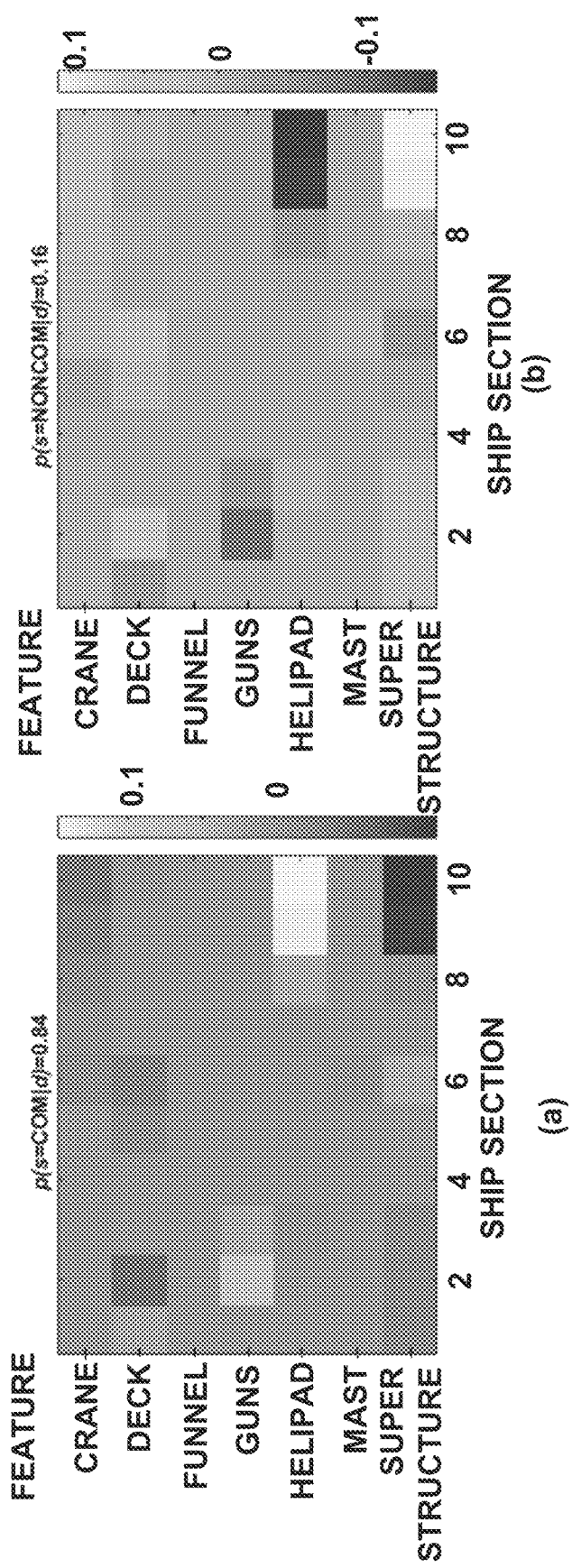
FIG. 9 illustrates, by way of example, a gradient of a posterior probability for (a) combatant and (b) non-combatant class one ISAR image.

FIG. 9 shows the gradient for an example target at the coarsest hierarchical level of taxonomy 800 that has only two classes, namely, COM and NONCOM. In this case, the target is classified as a combatant and it can be seen that the two features that have a significant positive gradient are guns in section 2 and helipad in sections 9 and 10 in FIG. 9(a). The presence of these features will further increase the posterior probability of this class. The features that are significant on the negative side is super structure in sections 9 and 10, and deck in section 2. The combatant class would like to have these feature not present in those section to boost its probability. The gradient of the non-combatant class shown in FIG. 9(b) has the opposite sign of the gradient in FIG. 9(a).

This is because the probability sums to one over these two classes so increasing the probability of one class takes away from the other class; the sum of the gradients for these classes is zero. Consequently, features that boosted the probability of combatant class by being present should be absent for the non-combatant class.

To convey which features in the ship model are consistent with the DL model data for a particular class, a consistency heat map, $c_s(\cdot,\cdot)$, where the sign of each element conveys its consistency (agreement or disagreement), and the magnitude, its degree of consistency can be displayed. As noted above, the sign of the gradient signifies whether a features needs to be present or absent. Whether the feature is actually present or absent is given by the data received from the DL models 556. The probability of the feature being present is given by $p(f_{ij}=1|d)$. For the binary discriminator, when $p(f_{ij}=1|d)>0.5$, the feature is present and vice versa. Given this property, if the sign of $p(f_{ij}=1|d)-0.5$ agrees with the sign of the gradient, the feature is in a state as required by the ship model. When the sign disagrees, the state of the feature is opposite of what is required for the ship class. With this in mind, define the consistency map as $$c_s(i, j) = (p_{ij} - 0.5) g_s(i, j) \tag{38}$$

$$= (p_{ij} - 0.5)\left(m_{sij} - p(s|d)\sum_{r \in S} m_{rij}\right).$$

Positive values in the consistency map signify consistency of the feature state with the ship model and negative values signify inconsistencies. Large values in the consistency map have large effect on the posterior probability and therefore the final decision.

Figure 10:
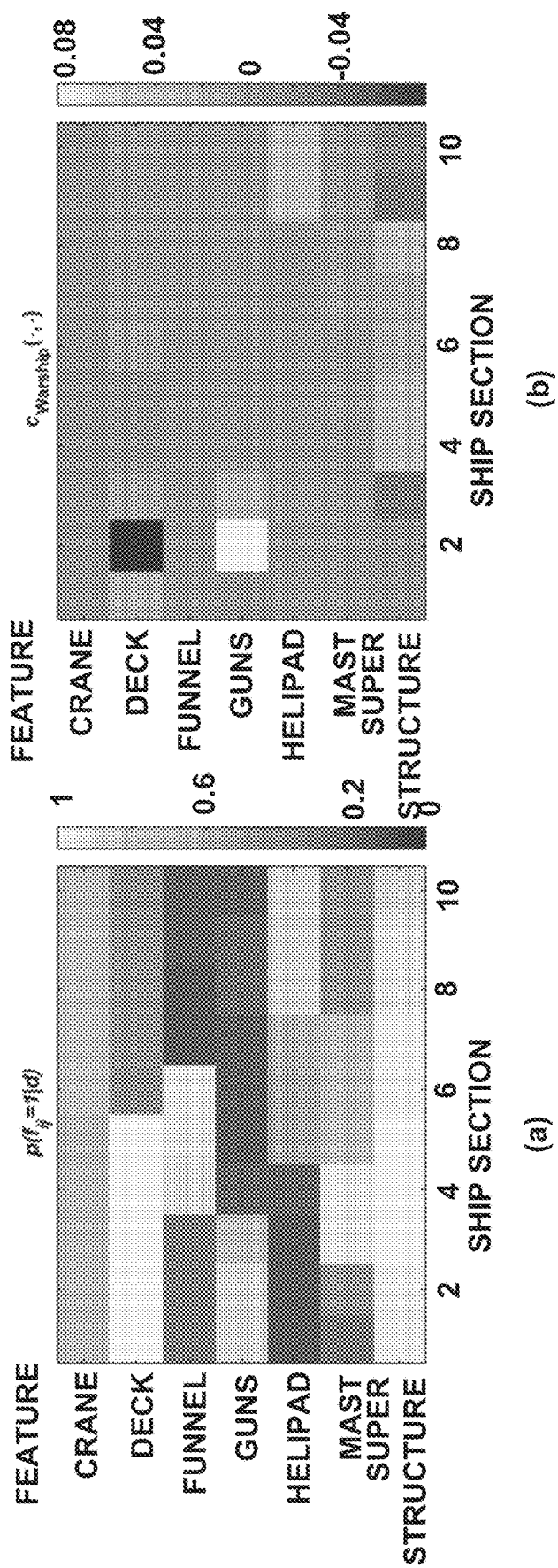
FIG. 10 illustrates, by way of example, a diagram of an embodiment of DL model data 10(a) and a consistency map 10(b) for a warship class.

FIG. 10 illustrates, by way of example, a diagram of an embodiment of DL model output data 10(a) and a consistency map 10(b) for a warship class. In this case, the DL model data (FIG. 10(a)) shows both guns and deck to be present in section 2 of the ship. However, the gradient for the Warship class wants only the guns to be present and the deck to be absent. The consistency map shown in FIG. 10(b) shows this clearly with a large positive value on the Guns and a large negative value on the deck. The Helipad is also consistent with the data while the super structure in the fore and aft shows a mild inconsistency.

The consistency map allows the operator to quickly see where the underlying is disagreeing with the final decision. The underlying ISAR data can then be reviewed for the features in question to see if the DL model may have made a mistake in discriminating the features. If the operator determines the DL model to be in error, the DL model data can be manually edited and fed back to the classifier for an updated decision. If the DL model output looks correct, the inconsistency can be attributed to the ship model not fitting the data very well. This may be due to the ship models being too simplistic and not capturing the variations seen in the real world or the sample corresponds to a new ship that is not represented in the ship database. In both cases, the ship database needs to be updated to properly model the captured sample.

Let $d_t$ denote a single frame of ISAR data collected at time t. Typically, each frame is collected at discrete time instances with $t=\{0, \Delta t, 2\Delta t, \ldots, n\Delta t\}$, where $\Delta t$ is the time between frames. Time is referenced using discrete frame indices, $t=\{1, \ldots, n\}$. As time goes by, the ISAR data stream can be fed to the MAP estimator to obtain a running estimate of the confidence associated with all of the ship classes based on the data from all frames collected until that point. The expectation is that as more data comes in, it will tend to harden the belief on the class of ships that bests explains the sensor data. The data acquisition may then be terminated once we are sufficiently confident on the class of ship.

Assuming the data between the frames gives independent information regarding the ships, we have $$\tilde{p}(s|\{d_t|t \leq n\}) = \prod_{t=1}^{n} \tilde{p}(s|d_t) = \underbrace{\prod_{t=1}^{n-1} \tilde{p}(s|d_t)}_{\tilde{p}(s|\{d_t|t \leq n-1\})} \tilde{p}(s|d_n), \tag{39}$$

which gives a recursive estimate of the ship likelihoods over time. The posterior probability can be computed by renormalizing the accumulated likelihoods at each time instance. The recursive estimate of eq. (39) weighs the information from each frame equally. However, not all ISAR frames have equal ship discrimination information content considering it is measuring the doppler spread of the moving features as the objects rocks back and forth in a periodic fashion. Generally speaking, radar has high range resolution and low angular resolution. Depending on the phase of the object motion, the information content may vary significantly. Also, the azimuth of the ship with respect to the sensor plays a big role in the information content. A ship is best viewed in ISAR from angles that are inclusive of a head- or tail-on aspect. This tends to properly separate the features of the ship along the LOA of the ship and eliminates the scenario where some features are shadowed by others in full head-on or tail-on views. When the viewing angle approaches beam views (close to 90 or 270 degrees), the features along the ship may not be linearly delineated anymore in ISAR and the classification becomes very difficult. For all these reasons, a weight $w_t$, $0 \leq w_t \leq 1$, is introduced for each frame at time t. The idea is to weight the contribution of each frame towards the overall classification decision in a more optimal fashion. Other sensing modalities, such as EO/IR that has high angular resolution and low range resolution, likely have different weighting.

The weighting can best be done in the posterior domain where the ship probabilities sum to 1 as opposed to the likelihood domain. The evidence provided by the frame at time t for each ship s is given by $p(s|d_t)$, where a value $p(s|d_t) > 1/n$, provides a positive reinforcement for ship s and $p(s|d_t) < 1/n$, provides a negative reinforcement. The new information coming in for all ships can be diluted towards $1/n_s$, which is akin to a non-informative prior for the ships, based on the weight associated with the frame. Using this strategy, the ship likelihoods obtained from the new frame at t=n are modified as $$\tilde{p}(s|d_n) \leftarrow w_t \underbrace{\frac{\tilde{p}(s|d_n)}{\sum_s \tilde{p}(s|d_n)}}_{\bar{p}(s|d_n)} + (1-w_t)\frac{1}{n_s} \quad (40)$$

before being fed to the recursive estimator. When $w_t=1$, the ship likelihoods obtained from the frame are left untouched (except for a scale factor, which is immaterial). When $w_t=0$, all the ship likelihoods become equal providing no discriminating information between the ships and make the contribution of the frame nil with respect to the final classification decision. For a weight value in between 0 and 1, the new information content provided by the frame is modulated by the weight of the frame. Substituting the modified likelihood of eq. (40) into eq. (39), the following recursive estimator is realized as $$\tilde{p}(s|\{d_t|t \le n\}) = \tilde{p}(s|\{d_t|t \le n-1\})\left(w_t p(s|d_n) + (1-w_t)\frac{1}{n_s}\right). \quad (41)$$

Earlier, an independence of information assumption between the frames was made. This is definitely true when the sensor noise dominates the decision-making process. However, if there is a model mismatch error between the data and the DL model discriminators and it is significant compared to sensor noise, then the frames may be correlated if the viewing conditions and object pose have not changed much between the collects. The information content between frames is then quite similar and ends up overcounting evidence if the independence assumption is made. The de-weighting of the information supplied by a frame can be leveraged to account for correlated frames as well. In this case, one could set the weight $w_t=1-c_t$ where $c_t$ is the correlation of frame at time t with previous frames.

Similarly, the frame weight may also be used to account for uncertainty in the estimate of the posterior probability provided by the frame. This uncertainty was computed previously. A system 1100 that operates using the weights determined in this manner is provided in FIG. 11.

Figure 11:
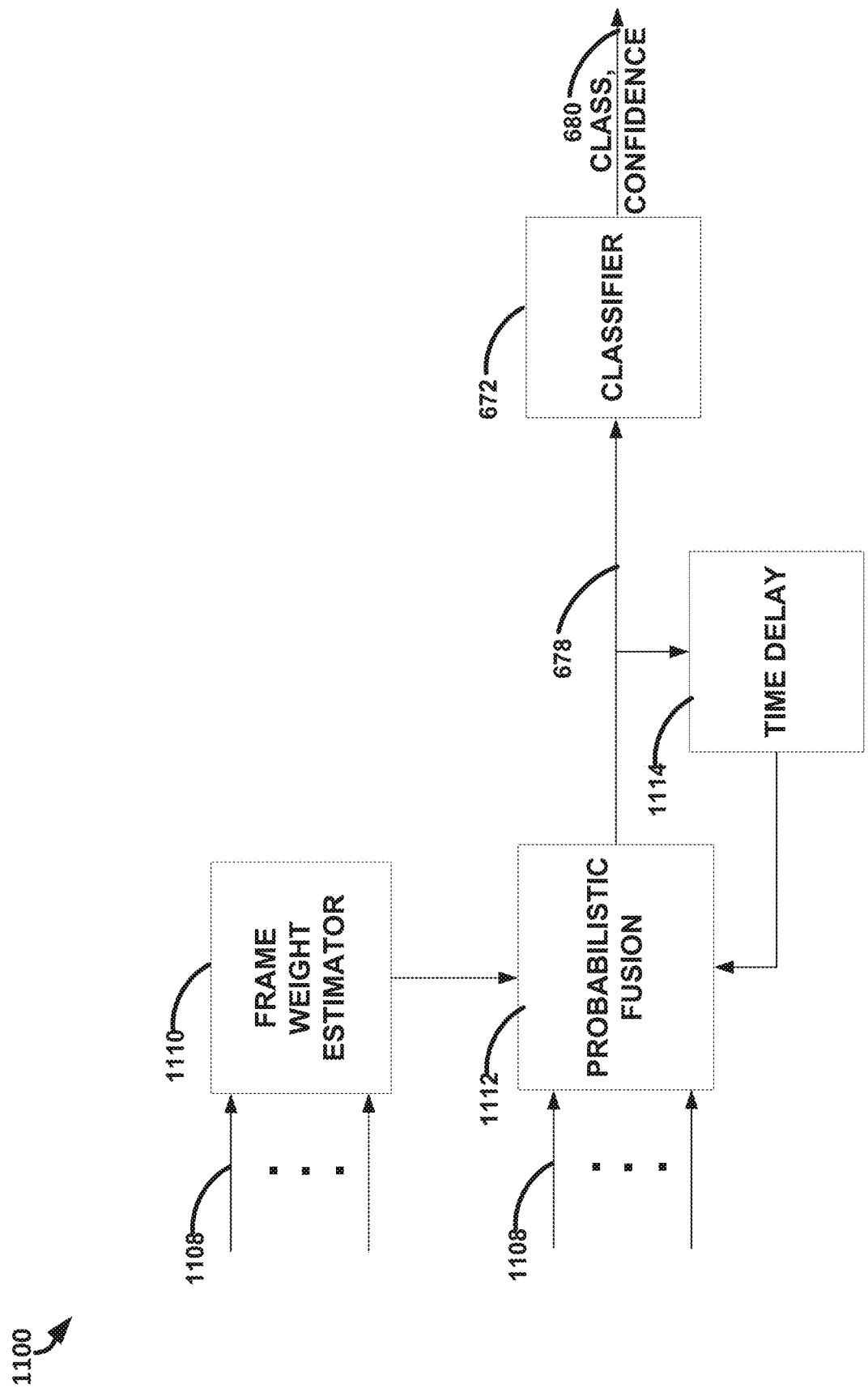
FIG. 11 illustrates, by way of example, a diagram of an embodiment of the system that weights frames of image data based on a correlation score of new feature data with old feature data.

FIG. 11 illustrates, by way of example, a diagram of an embodiment of the system 1100 that weights a time series of frames 1108 of image data based on a correlation score of new feature data with old feature data. The system 1100 as illustrated includes a frame weight estimator 1110, a probabilistic fuser 1112, the classifier 672, and a time delay operator 1114. The frame weight estimator 1110 determines the correlation between old and new data and provides a weight value based on the correlation as discussed previously. The probabilistic fuser 1112 operates in accordance with eq. (41) based on weights from the frame weight estimator 1110 and the posterior ship probabilities computed by system 700 modified using the weights in accordance with eq. (40). The time delay operator 1114 delays output from the probabilistic fuser 1112 so that it can be combined with output of data from a next frame in accordance with eq. (41). The classifier 672 operates to determine whether the class and corresponding confidence based on the posterior probabilities 678. If frames 1108 are more correlated to each other, the classifier 680 can take more frames to be sufficiently certain of a classification as compared to an instance in which the frames are less correlated.

The treatment above ignores the fact that some features such as a gantry crane may not be statically located but can move along the length of the ship. This section describes how embodiments can be extended to include moving features. An example ship specification matrix where the "crane" feature is specified as a moving feature with the locations that the feature can be found marked with an "m" is presented above. One can think of this as specifying multiple ship specification matrices with one of the "m" locations changed to a 1 and rest of the locations changed to a zero. If there are $n_m$ locations with a "m" designation, this produces $n_m$ combinations since the moving states are all mutually exclusive. If there are multiple moving features, with $n_{mi}$ denoting the number of moving locations for each moving feature i, then there are $\Pi_i n_{mi}$ combinations to consider. Let $F_s^{(k)}(\cdot,\cdot)$, $k=\{1,\ldots,n_m\}$ denote the $n_m$ different moving combinations as separate ship specification matrices. Then eq. (20) can be modified to sum across all the different moving states as $$\tilde{p}(s|d) = p(l_s|d, \mathcal{T})\sum_k \prod_{j=1}^{n_j} \prod_{i \in \mathcal{X}_{sj}^c} \tilde{p}(d|f_{ij} = F_s^{(k)}(i, j)). \quad (42)$$

Note that the ship specification matrix is static for the most part across all the $n_m$ combinations with only the moving locations changing states. This makes eq. (42) computationally inefficient as all the products are recomputed for each summation term. A better method would be to move the summation of the moving states as much inwards as possible. Towards this end, let $M_s$ denote a set of ordered pair indices (i,j) where feature i is tagged as moving in ship section j. Eq. (42) can then be rewritten as $$\tilde{p}(s|d) = \quad (43)$$

$$p(l_s|d, \mathcal{T})\left(\prod_{j=1}^{n_j} \prod_{i \in \mathcal{X}_{sj}^c, (i,j) \notin M_s} \tilde{p}(d|f_{ij} = F_s(i, j))\right)$$

$$\left(\sum_k \prod_{(i,j) \in M_s} \tilde{p}(d|f_{ij} = F_s^{(k)}(i, j))\right).$$

Note that computation in the last term of eq. (43) can be further reduced by recognizing that the "m" locations are all mutually exclusive for any one feature so rather than computing the product for all the "m" states for each k, one can compute the product once with all states set to zero, $\Pi_{ij}\tilde{p}(d|f_{ij}=0)$ and then multiply that product by the ratio of $\tilde{p}(d|f_{ij}=1)/\tilde{p}(d|f_{ij}=0)$ to selectively turn on one state at a time. This requires a single multiplication and division for each term in the summation. The posterior probability of the ship, p(s|d), is obtained normalizing the ship likelihoods given by eq. (19) across all the ships in the theater of operations.

The ship model formulated previously, discretized the ship along its LOA and required that features may either be present or absent in each section. This model does not capture the fact that a feature may straddle two adjacent sections and may be partially present in both. Also, capturing the model at a fixed discrete resolution precludes the usage of higher resolution data, if available. In this section, an analog feature model is proposed for the ship that can be discretized to match the resolution of the incoming data. The discretization process considers how the DL model discriminator was exercised on the ISAR frames to improve the fidelity of the model to the data.

Instead of storing a ship specification matrix $F_s$ for each ship s, an analog profile for each feature can be stored $$f_{si}(l) = \begin{cases} 1, & l \in \mathcal{L}_{si} \\ 0.5, & l \in \mathcal{X}_{si} \\ 0, & \text{otherwise} \end{cases} \quad (44)$$

where l denotes the length of the ship in normalized units, $0 \le l \le 1$, $\mathcal{L}_{si}$ is a finite union of closed intervals where the feature i can be found along the length of the ship, and $\mathcal{X}_{si}$ is a finite union of open intervals over which the specification matrix indicates "don't care" whether the feature is present or not. The function $f_{si}(l)$ is zero everywhere else and it is assumed that $\mathcal{L}_{si} \cap \mathcal{X}_{si} \ne \emptyset$.

Let $h_i(\cdot)$ be a top-hat function of width $w_i$ centered at zero representing the chip (window) size used by the DL model for feature i. It is assumed that the window size $w_i$ has been tuned to match the physical size of the feature so a properly centered window can capture most of the feature and no more than one full instance of the feature more or less at a time. Then the DL model output signaling the presence of the feature can be modeled as being proportional to the amount of feature actually encompassed by the window as it slides along the length of the ship. Let $l_j = (j - \frac{1}{2}) \Delta l$, $j = \{1, \ldots, n_l\}$, where $\Delta l$ is the bin spacing, denotes the locations along the length of the ship where sliding window output of the DL model is tapped. The discretized feature profile, $f_{si}(j)^2$, models what would be discriminated by the DL model. One can model the DL model output as a convolution of the windowing function with the analog feature profile $$\begin{aligned} f_{si}(j) &= \frac{1}{w_i}(f_{si}(\cdot) * h_i(\cdot))(l_j) \\ &= \frac{1}{w_i}\int_0^1 f_{si}(l) h_i(l_j - l) dl \\ &= \frac{1}{w_i}\int_{l_j - w_i/2}^{l_j + w_i/2} f_{si}(l) dl \end{aligned} \quad (45)$$

Note that the mapping between the analog and discrete feature profile given by eq. (45) is dependent on how the CNN results are produced for each bin. Other mappings are possible if the CNN output is modeled based on the percent overlap of the features with the window and if multiple window positions are used to contribute to each bin in the output profile.

The bin locations where the discretized profile is in a "don't care" state is how close it is to the value 0.5. A threshold can be used to determine the set of locations that matter most $$\mathcal{X}_{si}^c = \{j | f_{si}(j) \ge \text{threshold}, f_{si}(j) \le 1 - \text{threshold}\}. \quad (46)$$

Let the DL model output for each feature i and ship section j be denoted as $p_{ij}$. Recall that earlier this value was interpreted as $p_{ij} = p(f_{ij} = 1/d)$. This value can now represent the fraction the feature overlaps with the DL model window. With this interpretation, the DL model output can directly be compared to the profile $f_{si}(j)$ and the correlation coefficient can be used as a measure of how similar the two profiles are to each other $$c_{si} = \frac{\sum_{j \in \mathcal{X}_{si}^c}(f_{si}(j) - \overline{f}_{si})(p_{ij} - \overline{p}_i)}{\sqrt{\sum_{j \in \mathcal{X}_{si}^c}(f_{si}(j) - \overline{f}_{si})^2 \sum_{j \in \mathcal{X}_{si}^c}(p_{ij} - \overline{p}_i)^2}}, \text{ where} \quad (47)$$

$$\overline{f}_{si} = \frac{1}{|\mathcal{X}_{si}^c|} \sum_{j \in \mathcal{X}_{si}^c} f_{si}(j) \quad (48)$$

$$\overline{p}_i = \frac{1}{|\mathcal{X}_{si}^c|} \sum_{j \in \mathcal{X}_{si}^c} p_{ij}, \quad (49)$$

denote the mean values of the respective profiles and have excluded the "don't care" locations from the correlation computation. Armed with this similarity measure, define the likelihood of the data given the CNN discriminated profile for feature i as $$\tilde{p}(d|f_{si}(\cdot)) \propto c_{si}^+ \quad (50)$$

where $$c_{si}^+ = \max(c_{si}, \epsilon) \quad (51)$$

denotes the clipped correlation coefficient with negative values mapped to a small likelihood $\epsilon$. The overall likelihood for all the features is obtained using the conditional independence assumption for the data across the feature set $$\tilde{p}(d|s) \propto \prod_{i=1}^{n_f} \tilde{p}(d|f_{si}(\cdot)) = \prod_{i=1}^{n_f} c_{si}^+, \quad (52)$$

The posterior probability of each ship s can be computed as before $$\begin{aligned} p(s|d) &= \frac{\tilde{p}(d|s)}{\sum_{s \in S} \tilde{p}(d|s)} \\ &= \frac{\prod_{i=1}^{n_f} c_{si}^+}{\sum_{s \in S} \prod_{i=1}^{n_f} c_{si}^+} \end{aligned} \quad (53)$$

The analog ship model can be extended to handle moving features in a fashion similar to that outlined previously. Each moving feature will have nm profiles modeling the feature at different locations on the ship. One can compute the correlation for each of these profiles and sum them up to compute the likelihood of each ship.

Figure 12:
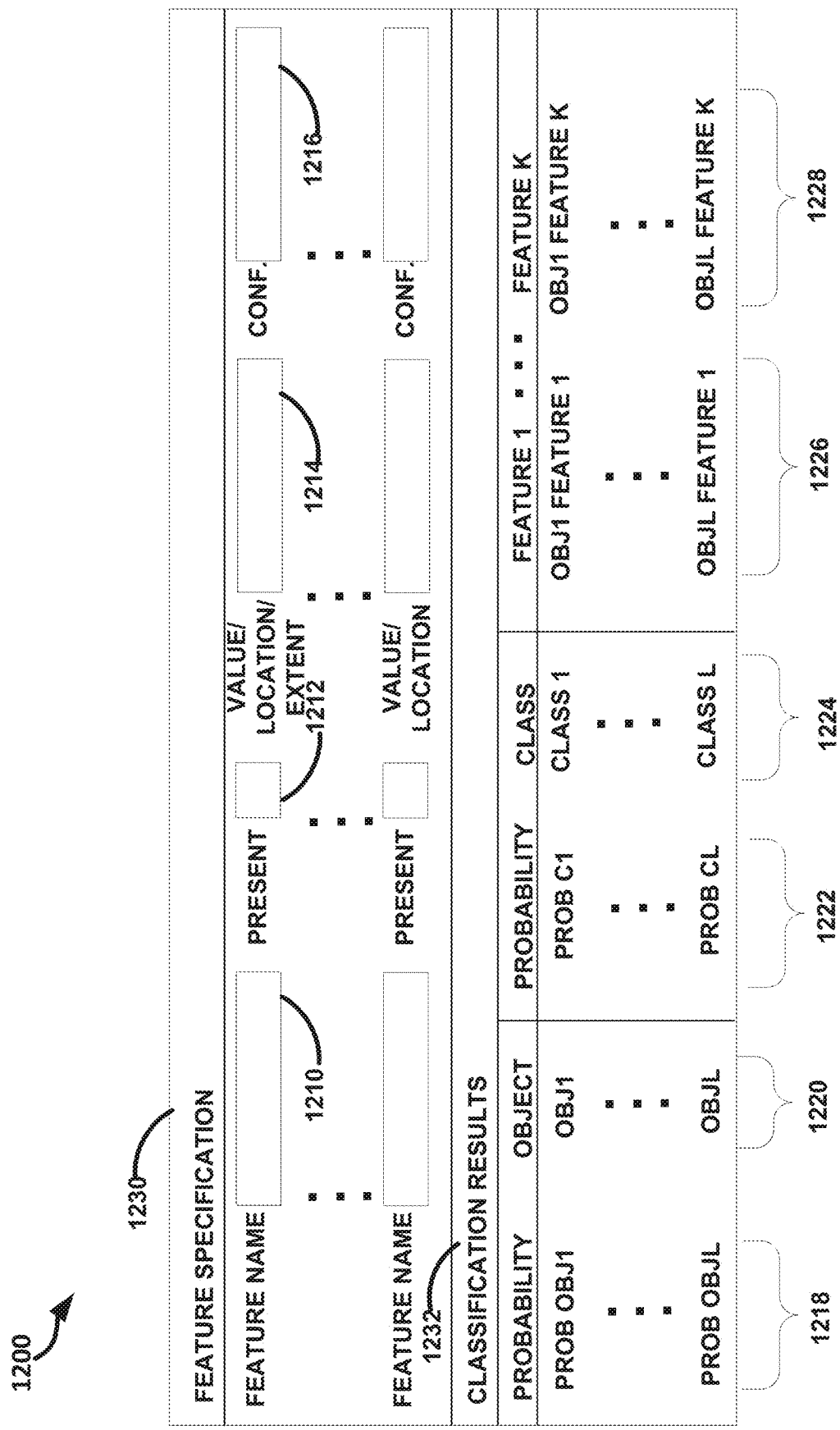
FIG. 12 illustrates, by way of example, a diagram of an embodiment of a user interface through which a user can specify feature data.

FIG. 12 illustrates, by way of example, a block diagram of a user interface (UI) 1200 for specifying the feature data 558. Instead of receiving the feature data 558 from the ensemble classifier 556, the feature data 558 can be received from a user through the UI 1200. The UI 1200 includes a feature specification region 1230 that includes software controls 1210, 1212, 1214, and 1216 through which the user can specify discriminated ship features after viewing an ISAR image (or some other acquired signal/image). The software control 1210 allows the user to specify a feature type. The software control 1212 allows the user to specify whether the feature indicated in the software control 1210 is present/absent in the ship. The software control 1214 allows the user to indicate a value or location for the feature specified by the software control 1210. The location or value can indicate the place along the one or more dimensions of the size overall of the ship or other object on which the feature is located. The location or value can indicate the magnitude of the dimension. The software control 1216 allows the user to specify a confidence on the value or location indicated by the software control 1214, in the form of a distribution, standard deviation, variance, mean, or a combination thereof. The software controls 1210, 1212, 1214, 1216 can include check-boxes, buttons, drop down menus, radio dials, radial dials, slider bars, or the like that allow the user to specify the information to be captured by the software control 1210, 1212, 1214, 1216.

The UI 1200 further includes a classification results region 1232 that includes results from the system 700. The results can be presented in the form of probabilities 1218 per object 1220, probabilities 1222 per class 1224, and whether features 1226, 1228 are present or absent or the value associated with the feature. The UI sorts all the object probabilities in a descending order such that the object with the maximum probability in the model database is displayed first followed by other objects with decreasing probabilities. The user can specify how many entries to display or a threshold probability that the object has to exceed for it to be visible in this list.

The UI can reorder the object list in real-time as the user specifies different features in 1230. By watching the real-time updates in the classification results 1232 as the user specifies the presence or absence of features, the user can discern which feature contributes to which classification decision. This real-time feedback thereby provides the user an explanation of the classification result.

Figure 13:
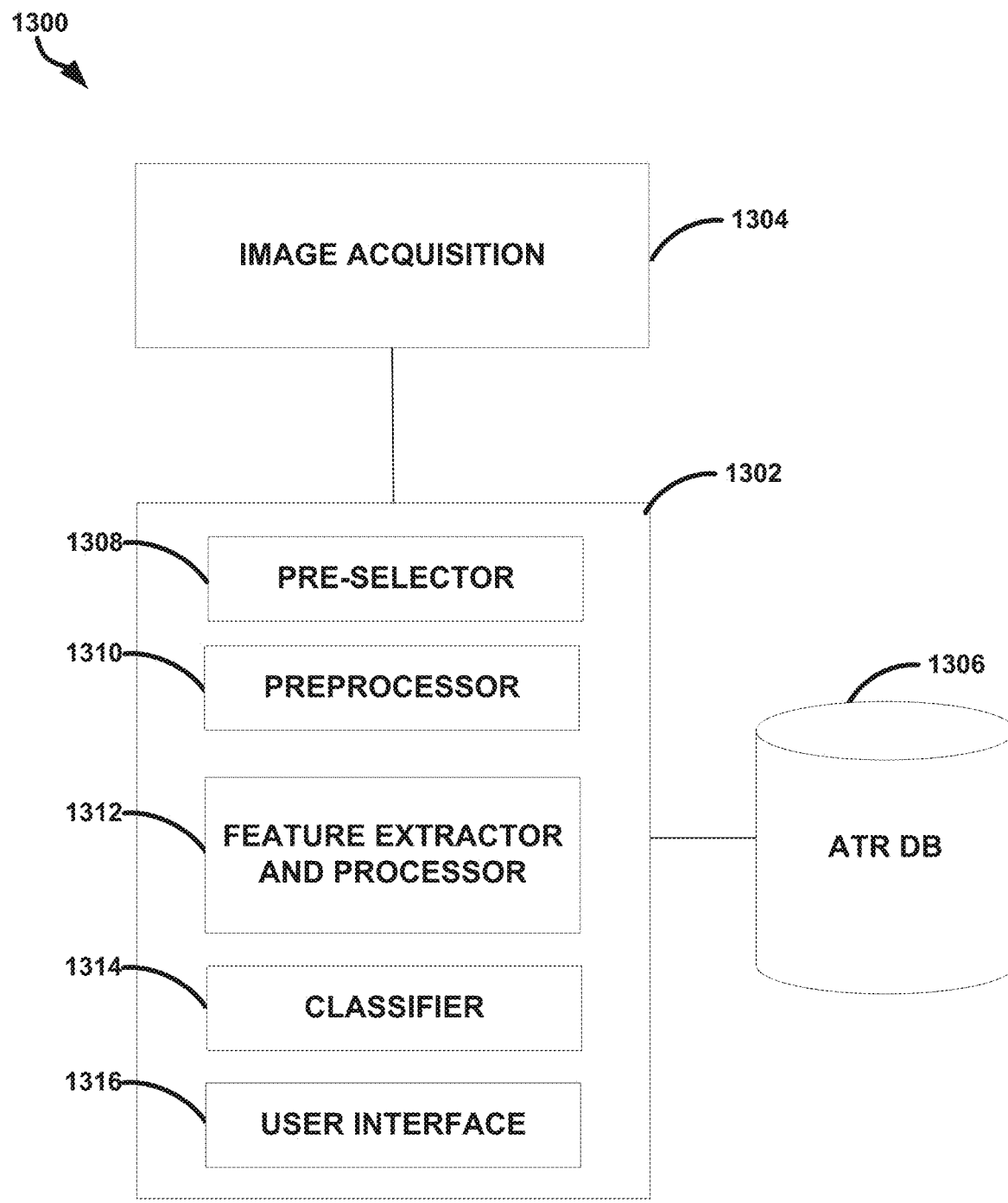
FIG. 13 illustrates, by way of example, a block diagram of an embodiment of an ATR system.

FIG. 13 illustrates, by way of example, a block diagram of an embodiment of an ATR system 1300. The ATR system 1300 as illustrated includes an image acquisition unit 1304, and ATR server 1302, a pre-selector 1308, a preprocessor 1310, feature extractor and processor 1312, a classifier 1314, a user interface 1316, and an ATR database 1306. An ATR processing chain can include a sequence of algorithms that includes preprocessing, feature extraction (for classification or training purposes), and classification.

Image acquisition unit 1304 may interface with and/or include a radar transceiver used to emit radar pulses and/or receive echoes from an illuminated target or terrain. Image acquisition unit 1304 may use any of various spectrum estimation techniques to create image data associated with a target. Unit 1304 may use fast Fourier transform imaging techniques including periodogram or matched filters, a Capon method, APES method, SAMV method, parametric subspace decomposition methods, MUSIC method, Overlapped Sub Aperture (OSA), autofocus, time-domain back projection, and/or frequency-domain back projection among other known techniques. Image acquisition unit 1304 may use variation reduction techniques depending on whether a SAR or ISAR is used to acquire target data (e.g., an image).

Unit 1304 may use techniques such as image energy normalization and/or pose rectification in radio frequency (RF) signal processing and image formation. Unit 1304 may apply a polar mapping method for ISAR images. Image acquisition unit 1304 may use various techniques to process raw radar target data to form a human perceivable image of an illuminated target, such as vessel 106 or another object.

Alternatively, image acquisition unit 1304 may process received radar data into a non-perceivable form that is then further processed by, for example, preprocessor 1310 to realize a human perceivable image. Image acquisition unit 1304 may process images and/or image data based on, without limitation, synthetic aperture radar (SAR), inverse synthetic aperture radar (ISAR), laser detection and ranging (LADAR), infrared detection, electro-optical (EO)/infrared (IR) (optical based imagery), and/or hyperspectral radar data.

Preprocessor 1310 may perform some or all of the operations described with respect to image acquisition unit 1304, such as, but not limited to, connecting ship regions, calculating the ship mid-line, splitting the image about the mid-line, creating a contiguous ship silhouette plot, and dividing the ship into three sections of bow, mid, and stern. Preprocessor 1310 may perform additional processor techniques to further enhance an image, such as the pre-process operation 338, such as, but not limited to, setting the image threshold, blurring the image, identifying and mitigating streaks, and identifying and mitigating whitewater and its effects. Preprocessor 1310 may remove non-linearities from the image, such as by performing the operation 338 or a portion thereof.

Pre-selector 1308 may receive a designation of an object type from an operator via user interface 1316. In certain implementations, pre-selector 1308 retrieves a portion or subset of target recognition data in database 1306 based on the object type. The object type may include a fundamental characteristic of a class of target such as, without limitation, target LOA axis, target width, target height, target state, target kinematics, target shape, target location, and/or mission context. Target state refers to intrinsically sensed characteristics, such as maneuvering, the presence or absence of fuel barrels, torpedoes, articulation of gantry cranes, jib cranes, masts, guns, and open or closed hatches.

ATR database 1306 may store target recognition data. The ATR database 1306 can include multiple reference features associated with each of multiple reference targets (e.g., object names or identifications that uniquely identify the object).

Feature extractor and processor 1312 may perform feature extraction on the enhanced image 340. The feature extractor and processor 1312 may be configured to compare and/or discriminate features of the object in the image 340. Feature extraction includes calculating geometric feature length, area, perimeter, and centroid per section, identifying the locations corresponding to the start and stop position and width of peaks, troughs, and extent-based features (e.g., masts, kingposts, funnels, deck breaks, etc.), determines the start and stop position and width of super structures, and creates a contiguous ship silhouette profile. Example features include apparent LOA, total number of significant peaks (a.k.a., local "hot spots"), number of peaks per bow, mid, and stern region, distance of the most significant peaks to the bow or aft.

Classifier 1314 may be configured to classify an object based on the feature from the feature extractor and processor 1312. Statistics-based classification compares the extracted geometric features to a database of ship models.

Classifier 1314 may combine one or more scores to rank and select the matching ship model using a maximum a posteriori (MAP) estimate. Classifier 1314 can include multiple decision trees that solve the classification problem. The classifier 1314 may use Bayesian networks or directed acyclic graphs (DAG). Classifier 1314 may select the decision tree having the minimal misclassification cost and determine a classification of the acquired target based on the features. Classifier 1314 may generate a classification decision report based on the determined classification of the acquired target in the image. Classifier 1314 may use one or more neural networks, such as multilayer perceptrons (MLPs), convolutional neural networks (CNNs), or deep Boltzmann machines (DBM) that are trained to compute a function that maps the feature to an output vector. The output vector may convey estimates of likelihoods of target classes (objects). In some implementations, classifier 1314 uses a recurrent neural network (RNN) where its neurons send feedback signals to each other to enable dynamic temporal behavior, such as determining whether a given image includes a feature based on one or more past images and the given image. Classifier 1314 may use an enhanced RNN referred to as long short-term memory (LSTM) and/or hierarchal temporal memory (HTM). Classifier 1314 may use fuzzy logic. A decision tree is a generic term that describes a decision process that may use one or more attributes at each node and/or use an information theoretic measure to formulate queries at each node. It does not refer to a specific implementation, but may include one or a combination of ID3, C4.5, and/or CART.

User interface 1316 may be arranged to display a classification decision report to an operator. The classification decision report may include a graphical explanation of the determined classification of an acquired target 344. The classification report may include a graphical representation of the decision tree having the minimal misclassification cost as illustrated in decision tree. The classification report may include the extracted features or machine representations of those features, such as the activation values of an NN hidden layer forming a mapping or manifold. In some implementations, classifier 1314 fuses a portion of reference features of the multiple reference features in database 1306 to provide confidence metrics associated with a determined classification of an acquired target in the image.

As explained elsewhere, embodiments are illustrated and described generally using ships as example objects that include features disposed along a LOA of the ship. Other objects include features disposed along the length thereof. Some example objects and corresponding features include an airplane with features of engine (sub-features jet, prop, turbofan, or the like), fuselage, identification, insignia, rudder, tail, windows, wings, among others; antenna with features of aerial, articulated, dish, rotating, tower, among others; building with features of bunker, columns, doors (sub-features of double, single, rolling), mouldings, roof (sub-features of flat, pitched), window, among others; convoy with features car, dismounts, end vehicle, lead vehicle, truck, tank, among others; foliage with features bushes, grass, shrubs, trees (sub-features of branch, conifer, deciduous, fruit, limb, trunk), among others; gatherings with features assembly, formation, parade, pedestrians (sub-features of cueing, marching, milling, random, tight, walking), sidewalk, sporting, among others; installations with features of artillery, barracks, command, platoon, surface-to-air missile (SAM) (sub-features of command, launcher, radar), among others; land mass with features of bay, continent, littoral, mountain, island, jetty, man-made, among others; space systems with features of launch vehicle, nozzle, satellite (sub-features of communication, EO, weather), solar panels, among others; unmanned aerial vehicle (UAV) with features of airplane, drone, helicopter, hybrid, multi-rotor, quad, among others; and vehicles with features of antenna, bed, body, cab, engine compartment, fuel container, skirt, turret, wheel, among others. This list of objects (or collections of objects) is not exhaustive and other objects with features that vary in location along the length thereof are applicable to embodiments.

While this description regards ISAR and provides distance relative to LOA axis (a distance in range), for other imagery systems, positions along LOA axis does not make sense or is not the most efficient choice. For example, in electro-optical (EO)/infrared (IR) imagery the coordinate system has 2 spatial elements X and Y (azimuth and elevation); likewise in radar data the dimensions are both spatial elements (range and azimuth). In these it can be more intuitive to use a two-dimensional (2D) or three-dimensional (3D) mappings of feature positions instead of a one-dimensional (1D) mapping to an LOA axis as is suggested for use with ISAR herein. A machine learning system can be trained to mimic the Bayesian model-based system.

Figure 14:
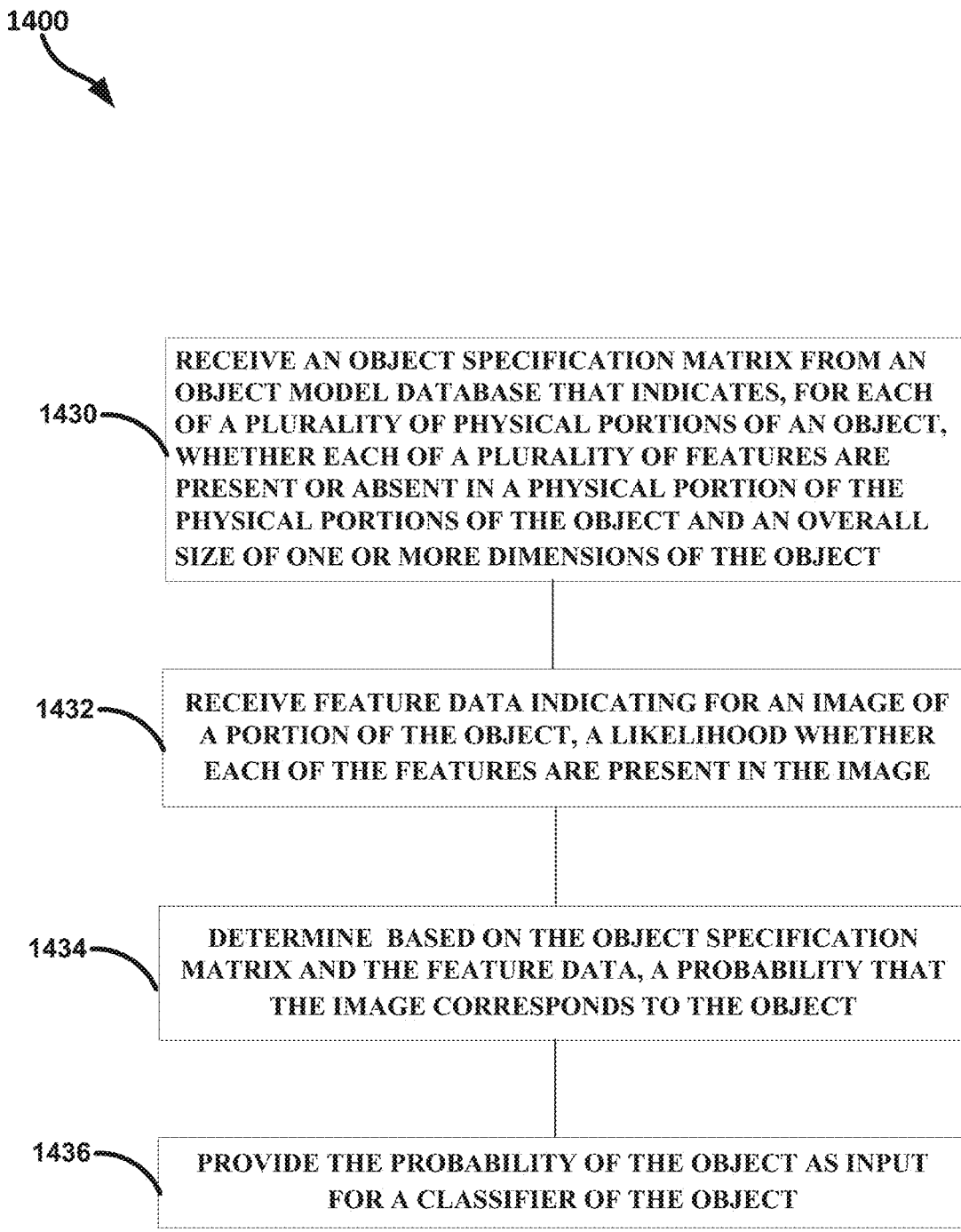
FIG. 14 illustrates, by way of example, a block diagram of an embodiment of a method for ATR with explainability.

FIG. 14 illustrates, by way of example, a block diagram of an embodiment of a method 1400 for. The method 1400 as illustrated includes receiving an object specification matrix from an object model database that indicates, for each of a plurality of physical portions of an object, whether each of a plurality of features are present or absent in a physical portion of the physical portions of the object and an overall size of one or more dimensions of the object, at operation 1430; receiving feature data indicating for an image of a portion of the object, a likelihood whether each of the features are present in the image, at operation 1432; determining based on the object specification matrix and the feature data, a probability that the image corresponds to the object, at operation 1434; and providing the probability and corresponding uncertainty of the object to help classify the object, at operation 1436.

The method 1400 can further include, wherein the object specification matrix indicates, for each feature, whether the feature is present, absent, or do not care in the physical portion. The method 1400 can further include, wherein the object specification matrix further indicates, for each feature, whether the feature can move into the physical portion. The method 1400 can further include determining, based on a number of features of the features present/not present in the image and not present/present in the object specification matrix, a likelihood that the object corresponds to an unknown class of objects that does not have a corresponding object specification matrix in an object model database. The method 1400 can further include generating, based on the feature data, a new object specification matrix and adding it to the object model database when the probability of the unknown class object is greater than the probability of the objects in the object model database The method 1400 can further include providing explainability and consistency metrics that explain a classification of the object, the explainability and consistency metrics show how consistent the object specification matrix is with respect to the feature data. The method 1400 can further include, wherein the feature data is provided by a human with a view of the image of the object. The method 1400 can further include, wherein the probability of all the objects in the ship model database is updated in real-time as the user varies the feature data and wherein the explainability metric is a sorted list of objects sorted based on the probability of the objects. The method 1400 can further include, wherein the feature data is generated by an ensemble classifier, which includes a plurality of classifiers each trained to discriminate whether a single feature of the features is present in the image.

The method 1400 can further include, wherein the image is an inverse synthetic aperture radar (ISAR), electro-optical (EO), multi-spectral, color, or laser detection and ranging (LADAR) image. The method 1400 can further include, wherein receiving the object specification matrix includes receiving the object specification matrix from a user, through a user interface. The method 1400 can further include, wherein receiving the object specification matrix includes receiving the object specification matrix from an object model database.

The method 1400 can further include estimating proportional feature displacement of features of the object. The method 1400 can further include determining the probability and corresponding uncertainty that the image corresponds to the object is further based on the estimated proportional feature displacement of the features of the object and the overall size of the dimensions of the object. The method 1400 can further include, wherein the image is one image in a time series of images.

The method 1400 can further include estimating overall size of the dimensions of the object. The method 1400 can further include receiving actual overall size of the dimensions of the object from the object model database. The method 1400 can further include determining the probability that the image corresponds to the object is further based on the estimated overall size of the dimensions of the object and the actual overall size of the dimensions of the object.

The method 1400 can further include determining a frame weight for each of the time series of images. The method 1400 can further include modifying the probability of the object for each image based on the frame weight. The method 1400 can further include using the modified probability of the object for each image in the time series to compute an overall probability of the object in the time series of images.

The method 1400 can further include, wherein the frame weight for each image of the time series is based on the correlation of the image with the images for previous images in the time series of images. The method 1400 can further include, wherein the correlation is determined by a relative change in viewing geometry of the image with respect to respective viewing geometries of previous images in the time series of images. The method 1400 can further include, wherein the frame weight for each image is based on the uncertainty of the classification of the object for that image.

Artificial Intelligence (AI) is a field concerned with developing decision-making systems to perform cognitive tasks that have traditionally required a living actor, such as a person. Neural networks (NNs) are computational structures that are loosely modeled on biological neurons. Generally, NNs encode information (e.g., data or decision making) via weighted connections (e.g., synapses) between nodes (e.g., neurons). Modern NNs are foundational to many AI applications, such as object recognition, or the like. The classifier 1314, which can include the classifier 672, can include one or more NNs.

Many NNs are represented as matrices of weights (sometimes called parameters) that correspond to the modeled connections. NNs operate by accepting data into a set of input neurons that often have many outgoing connections to other neurons. At each traversal between neurons, the corresponding weight modifies the input and is tested against a threshold at the destination neuron. If the weighted value exceeds the threshold, the value is again weighted, or transformed through a nonlinear function, and transmitted to another neuron further down the NN graph-if the threshold is not exceeded then, generally, the value is not transmitted to a down-graph neuron and the synaptic connection remains inactive. The process of weighting and testing continues until an output neuron is reached; the pattern and values of the output neurons constituting the result of the NN processing.

The optimal operation of most NNs relies on accurate weights. However, NN designers do not generally know which weights will work for a given application. NN designers typically choose a number of neuron layers or specific connections between layers including circular connections. A training process may be used to determine appropriate weights by selecting initial weights.

In some examples, initial weights may be randomly selected. Training data is fed into the NN, and results are compared to an objective function that provides an indication of error. The error indication is a measure of how wrong the NN's result is compared to an expected result. This error is then used to correct the weights. Over many iterations, the weights will collectively converge to encode the operational data into the NN. This process may be called an optimization of the objective function (e.g., a cost or loss function), whereby the cost or loss is minimized.

A gradient descent technique is often used to perform objective function optimization. A gradient (e.g., partial derivative) is computed with respect to layer parameters (e.g., aspects of the weight) to provide a direction, and possibly a degree, of correction, but does not result in a single correction to set the weight to a "correct" value. That is, via several iterations, the weight will move towards the "correct," or operationally useful, value. In some implementations, the amount, or step size, of movement is fixed (e.g., the same from iteration to iteration). Small step sizes tend to take a long time to converge, whereas large step sizes may oscillate around the correct value or exhibit other undesirable behavior. Variable step sizes may be attempted to provide faster convergence without the downsides of large step sizes.

Backpropagation is a technique whereby training data is fed forward through the NN—here "forward" means that the data starts at the input neurons and follows the directed graph of neuron connections until the output neurons are reached—and the objective function is applied backwards through the NN to correct the synapse weights. At each step in the backpropagation process, the result of the previous step is used to correct a weight. Thus, the result of the output neuron correction is applied to a neuron that connects to the output neuron, and so forth until the input neurons are reached. Backpropagation has become a popular technique to train a variety of NNs. Any well-known optimization algorithm for back propagation may be used, such as stochastic gradient descent (SGD), Adam, etc.

Figure 15:
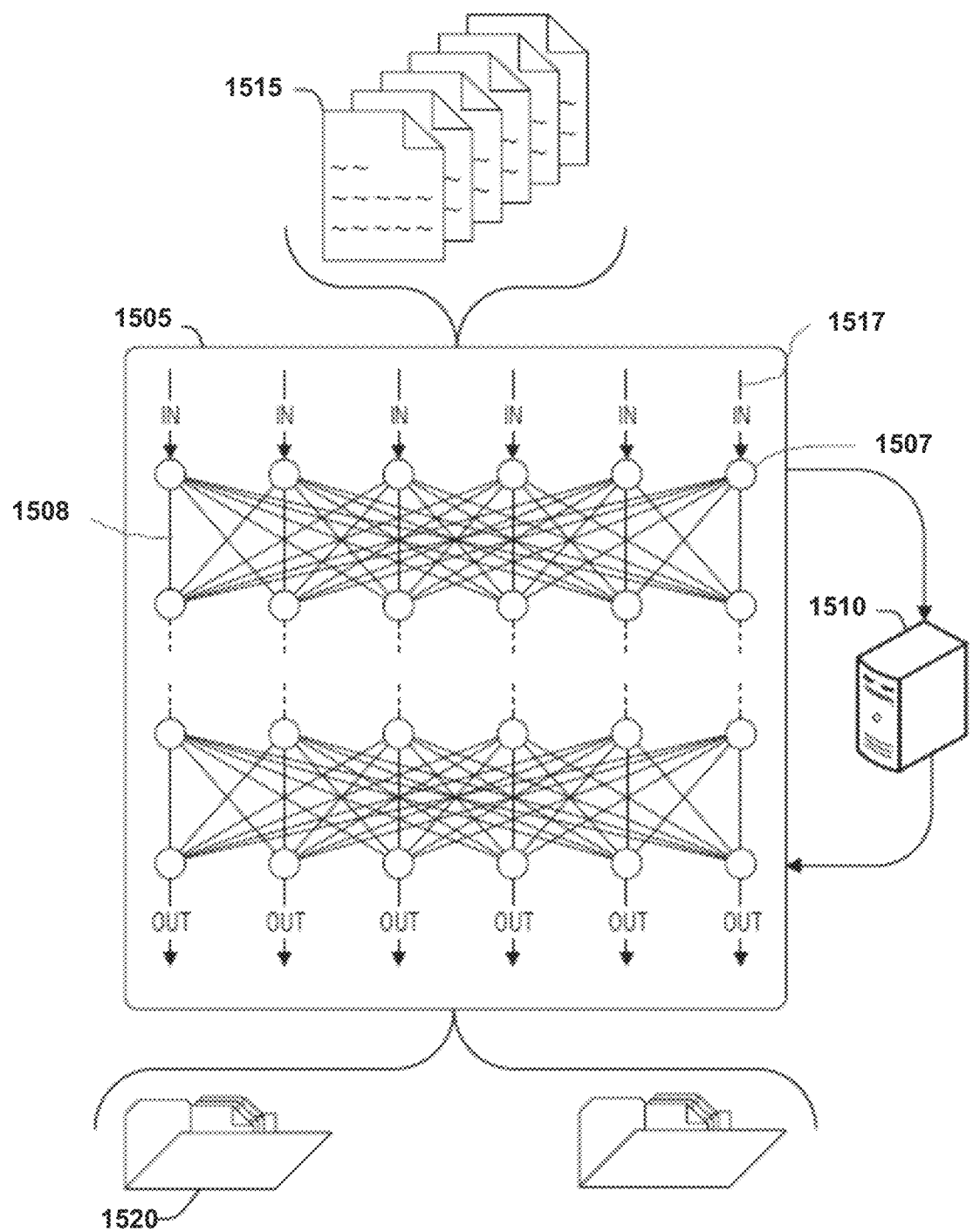
FIG. 15 is a block diagram of an example of an environment including a system for neural network training.

FIG. 15 is a block diagram of an example of an environment including a system for neural network training. The system includes an artificial NN (ANN) 1505 that is trained using a processing node 1510. The processing node 1510 may be a central processing unit (CPU), graphics processing unit (GPU), field programmable gate array (FPGA), digital signal processor (DSP), application specific integrated circuit (ASIC), or other processing circuitry. In an example, multiple processing nodes may be employed to train different layers of the ANN 1505, or even different nodes 1507 within layers. Thus, a set of processing nodes 1510 is arranged to perform the training of the ANN 1505.

The set of processing nodes 1510 is arranged to receive a training set 1515 for the ANN 1505. The ANN 1505 comprises a set of nodes 1507 arranged in layers (illustrated as rows of nodes 1507) and a set of inter-node weights 1508 (e.g., parameters) between nodes in the set of nodes. In an example, the training set 1515 is a subset of a complete training set. Here, the subset may enable processing nodes with limited storage resources to participate in training the ANN 1505.

The training data may include multiple numerical values representative of a domain, such as an image feature, or the like. Each value of the training or input 1517 to be classified after ANN 1505 is trained, is provided to a corresponding node 1507 in the first layer or input layer of ANN 1505. The values propagate through the layers and are changed by the objective function.

As noted, the set of processing nodes is arranged to train the neural network to create a trained neural network. After the ANN is trained, data input into the ANN will produce valid classifications 1520 (e.g., the input data 1517 will be assigned into categories), for example. The training performed by the set of processing nodes 1507 is iterative. In an example, each iteration of the training the ANN 1505 is performed independently between layers of the ANN 1505. Thus, two distinct layers may be processed in parallel by different members of the set of processing nodes. In an example, different layers of the ANN 1505 are trained on different hardware. The members of different members of the set of processing nodes may be located in different packages, housings, computers, cloud-based resources, etc. In an example, each iteration of the training is performed independently between nodes in the set of nodes. This example is an additional parallelization whereby individual nodes 1507 (e.g., neurons) are trained independently. In an example, the nodes are trained on different hardware.

Figure 16:
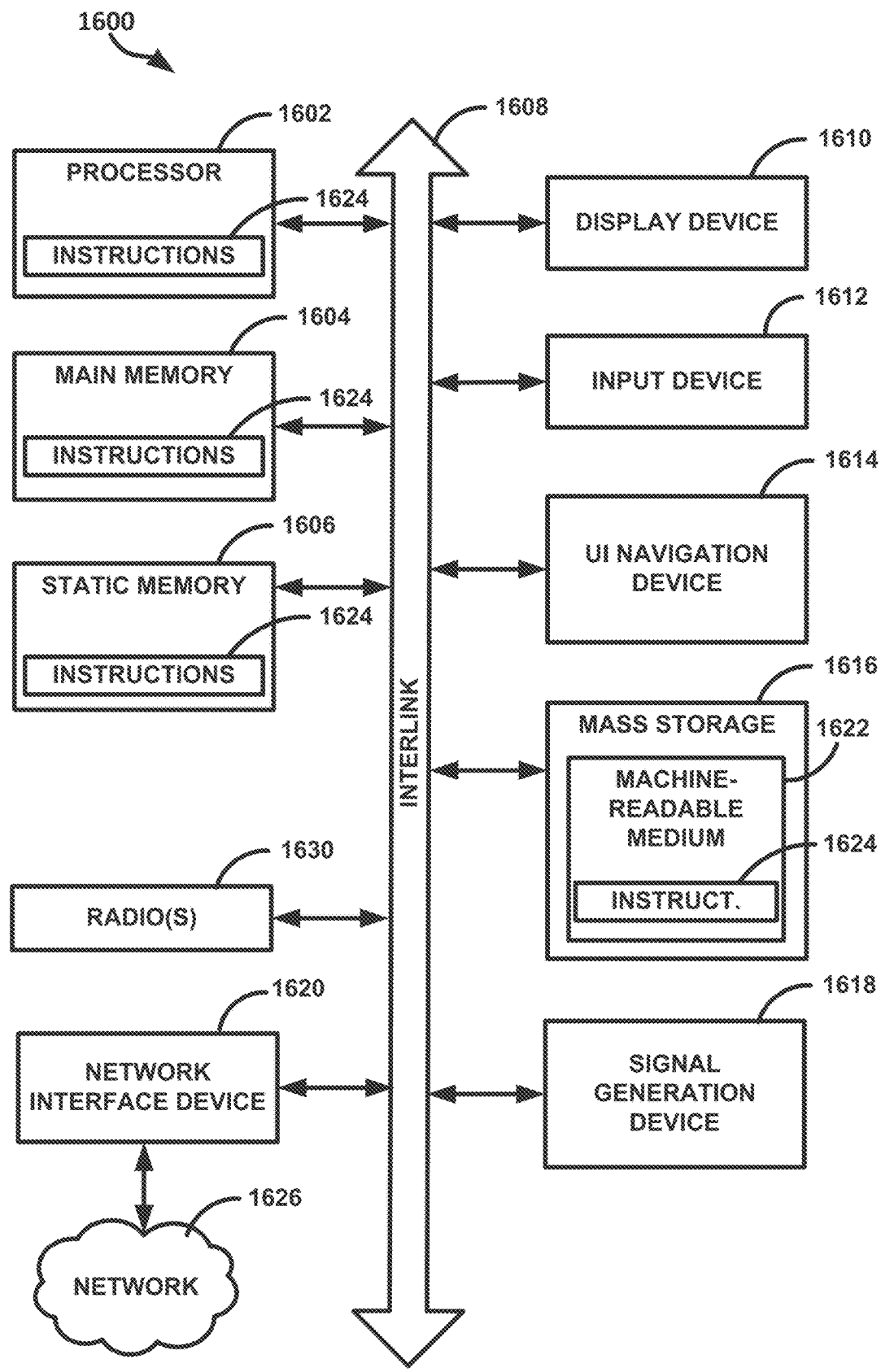
FIG. 16 illustrates, by way of example, a block diagram of an embodiment of a machine in the example form of a computer system within which instructions, for causing the machine to perform any one or more of the methodologies discussed herein, may be executed.

FIG. 16 illustrates, by way of example, a block diagram of an embodiment of a machine in the example form of a computer system 1600 within which instructions, for causing the machine to perform any one or more of the methodologies discussed herein, may be executed. One or more of the aircraft 102, vessel 106, operation 338, operation 342, chip operation 552, ensemble classifier 556, compiler 560, system 600, operation 660, 670, 672, system 700, block 794, selector 781, multiplier 786, accumulator 790, combiner 792, generator 772, normalizer 796, UI 1200, image acquisition unit 1304, ATR system 1300, ATR server 1302, pre-selector 1308, preprocessor 1310, feature extractor and processor 1312, classifier 1314, user interface 1316, method 1400 or other device, component, operation, or method discussed can include, or be implemented or performed by one or more of the components of the computer system 1600. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1600 includes a processor 1602 (e.g., a central processing unit (CPU), a graphics processing unit (GPU) or both), a main memory 1604 and a static memory 1606, which communicate with each other via a bus 1608. The computer system 1600 may further include a video display unit 1610 (e.g., a liquid crystal display (LCD) or a cathode ray tube (CRT)). The computer system 1600 also includes an alphanumeric input device 1612 (e.g., a keyboard), a user interface (UI) navigation device 1614 (e.g., a mouse), a mass storage unit 1616, a signal generation device 1618 (e.g., a speaker), a network interface device 1620, and a radio 1630 such as Bluetooth, WWAN, WLAN, and NFC, permitting the application of security controls on such protocols.

The mass storage unit 1616 includes a machine-readable medium 1622 on which is stored one or more sets of instructions and data structures (e.g., software) 1624 embodying or utilized by any one or more of the methodologies or functions described herein. The instructions 1624 may also reside, completely or at least partially, within the main memory 1604 and/or within the processor 1602 during execution thereof by the computer system 1600, the main memory 1604 and the processor 1602 also constituting machine-readable media.

While the machine-readable medium 1622 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding, or carrying instructions for execution by the machine and that cause the machine to perform any one or more of the methodologies of the present invention, or that is capable of storing, encoding, or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

The instructions 1624 may further be transmitted or received over a communications network 1626 using a transmission medium. The instructions 1624 may be transmitted using the network interface device 1620 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi and WiMax networks). The term "transmission medium" shall be taken to include any intangible medium that is capable of storing, encoding, or carrying instructions for execution by the machine, and includes digital or analog communications signals or other intangible media to facilitate communication of such software.

Additional Notes and Examples

Example 1 includes a method for machine learning (ML) automatic target recognition (ATR) decision explanation, the method comprising receiving an object specification matrix from an object model database that indicates, for each of a plurality of physical portions of an object, whether each of a plurality of features are present or absent in a physical portion of the physical portions of the object and a proportional physical displacement between the features in the object, receiving feature data indicating for an image of a portion of the object, a likelihood whether each of the features are present in the image, determining based on the object specification matrix and the feature data, a probability that the image corresponds to the object, and providing the probability of the object to help classify the object.

In Example 2, Example 1 further includes, wherein the object specification matrix indicates, for each feature, whether the feature is present, absent, or do not care in the physical portion.

In Example 3, Example 2 further includes, wherein the object specification matrix further indicates, for each feature, whether the feature can move into the physical portion.

In Example 4, at least one of Examples 1-3 further includes determining, based on a number of features of the features present/not present in the image and not present/present in the object specification matrix, a likelihood that the object corresponds to an unknown class of objects that does not have a corresponding object specification matrix in an object model database.

In Example 5, Example 4 further includes generating, based on the feature data, a new object specification matrix and adding it to the object model database when the probability of the unknown class object is greater than the probability of the objects in the object model database In Example 6, at least one of Examples 1-5 further includes providing explainability and consistency metrics that explain a classification of the object, the explainability and consistency metrics show how consistent the object specification matrix is with respect to the feature data.

In Example 7, Example 6 further includes, wherein the feature data is provided by a human with a view of the image of the object.

In Example 8, Example 7 further includes, wherein the probability of all the objects in the ship model database is updated in real-time as the user varies the feature data and wherein the explainability metric is a sorted list of objects sorted based on the probability of the objects.

In Example 9, at least one of Examples 1-8 further includes, wherein the feature data is generated by an ensemble classifier, which includes a plurality of classifiers each trained to discriminate whether a single feature of the features is present in the image.

In Example 10, at least one of Examples 1-9 further includes, wherein the image is an inverse synthetic aperture radar (ISAR), electro-optical (EO), multi-spectral, color, or laser detection and ranging (LADAR) image.

In Example 11, at least one of Examples 1-10 further includes, wherein receiving the object specification matrix includes receiving the object specification matrix from a user, through a user interface.

In Example 12, at least one of Examples 1-11 further includes, wherein the feature data includes uncertainty associated with the likelihood of the feature and the method further comprises determining a corresponding uncertainty based on the uncertainty associated with the likelihood of the feature data.

In Example 13, at least one of Examples 1-12 further includes estimating overall size of the dimensions of the object, receiving actual overall size of the dimensions of the object from the object model database, and determining the probability that the image corresponds to the object is further based on the estimated overall size of the dimensions of the object and the actual overall size of the dimensions of the object.

In Example 14, at least one of Examples 1-13 further includes, wherein the image is one image in a time series of images, the method further comprising determining a frame weight for each of the time series of images, modifying the probability of the object for each image based on the frame weight, and using the modified probability of the object for each image in the time series to compute an overall probability of the object in the time series of images.

In Example 15, Example 14 further includes, wherein the frame weight for each image of the time series is based on the correlation of the image with the images for previous images in the time series of images.

In Example 16, Example 15 further includes, wherein the correlation is determined by a relative change in viewing geometry of the image with respect to respective viewing geometries of previous images in the time series of images.

In Example 17, at least one of Examples 14-16 further includes, wherein the frame weight for each image is based on the uncertainty of the classification of the object for that image.

Example 18 includes a non-transitory machine-readable medium including instructions that, when executed by a machine, cause the machine to perform the method of at least one of Examples 1-17.

Example 19 includes a memory device including instructions stored thereon, and processing circuitry coupled to the memory device, the processing circuitry configured to execute the instructions, the instructions, when executed by the processing circuitry cause the processing circuitry to perform operations for machine learning (ML) automatic target recognition (ATR) decision explanation, the operations comprising the method of at least one of Examples 1-17.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

What is claimed is:

1. A method for machine learning (ML) automatic target recognition (ATR) decision explanation, the method comprising: receiving an object specification matrix from an object model database that indicates, for each of a plurality of physical portions of an object, whether each of a plurality of features are present or absent in a physical portion of the physical portions of the object and a proportional physical displacement between the features in the object; receiving, from one or more deep learning (DL) models, feature data indicating for an image of a portion of the object, a likelihood whether each of the features are present in the image; determining, by a classifier and based on the object specification matrix and the feature data, classification results that includes respective probabilities per object that the image corresponds to the object, respective probabilities per class that the object corresponds to the class and whether features of the plurality of features are present or absent in the image; and providing, by a user interface, the classification results with the probabilities sorted in descending order and including (i) a user-specified number of the features or (ii) the features associated with probabilities that exceed a user-specified threshold.

2. The method of claim 1, wherein the object specification matrix indicates, for each feature, whether the feature is present, absent, or do not care in the physical portion.

3. The method of claim 2, wherein the object specification matrix further indicates, for each feature, whether the feature can move into the physical portion.

4. The method of claim 1, further comprising:
determining, based on a number of features of the features present/not present in the image and not present/present in the object specification matrix, a likelihood that the object corresponds to an unknown class of objects that does not have a corresponding object specification matrix in an object model database.

5. The method of claim 4, further comprising:
generating, based on the feature data, a new object specification matrix and adding it to the object model database when the probability of the unknown class object is greater than the probability of the objects in the object model database.

6. The method of claim 1, further comprising:
providing explainability and consistency metrics that explain a classification of the object, the explainability and consistency metrics show how consistent the object specification matrix is with respect to the feature data.

7. The method of claim 6, wherein a portion of the feature data is provided by a human with a view of the image of the object.

8. The method of claim 7, wherein the probability of all the objects in the object model database for which there is a corresponding object specification matrix is updated in real-time as a user varies the portion of the feature data and wherein the explainability metric is a real-time sorted list of objects sorted based on the probability of the objects.

9. The method of claim 1, wherein the feature data is generated by an ensemble classifier, which includes a plurality of classifiers each trained to discriminate whether a single feature of the features is present in the image.

10. The method of claim 1, wherein the image is an inverse synthetic aperture radar (ISAR), electro-optical (EO), multi-spectral, color, or laser detection and ranging (LADAR) image.

11. The method of claim 1, wherein receiving the object specification matrix includes receiving the object specification matrix from a user, through a user interface.

12. The method of claim 1, wherein the feature data includes uncertainty associated with the likelihood of the feature and the method further comprises determining a corresponding uncertainty that the image corresponds to the object based on the uncertainty associated with the likelihood of the feature data.

13. The method of claim 1, further comprising:
estimating overall size of dimensions of the object;
receiving actual overall size of the dimensions of the object from the object model database; and
determining the probability that the image corresponds to the object is further based on the estimated overall size of the dimensions of the object and the actual overall size of the dimensions of the object.

14. The method of claim 1, wherein the image is one image in a time series of images, the method further comprising:
determining a frame weight for each of the time series of images;
modifying the probability of the object for each image based on the frame weight; and
using the modified probability of the object for each image in the time series to compute an overall probability of the object in the time series of images.

15. The method of claim 14, wherein the frame weight for each image of the time series is based on a correlation of the image with previous images in the time series of images.

16. The method of claim 15, wherein the correlation is determined by a relative change in viewing geometry of the image with respect to respective viewing geometries of previous images in the time series of images.

17. The method of claim 1, wherein the feature data includes uncertainty associated with the likelihood of the feature and the image is one image in a time series of images, the method further comprises:
determining a corresponding uncertainty that the image corresponds to the object based on the uncertainty associated with the likelihood of the feature,
determining, based on the uncertainty of the classification of the object for that image, a frame weight for each of the time series of images;
modifying the probability of the object for each image based on the frame weight; and
using the modified probability of the object for each image in the time series to compute an overall probability of the object in the time series of images.

18. A non-transitory machine-readable medium including instructions that, when executed by a machine, cause the machine to perform operations for machine learning (ML) automatic target recognition (ATR) decision explanation, the operations comprising: receiving an object specification matrix from an object model database that indicates, for each of a plurality of physical portions of an object, whether each of a plurality of features are present or absent in a physical portion of the physical portions of the object and a proportional physical displacement between the features in the object; receiving, from one or more deep learning (DL) models, feature data indicating for an image of a portion of the object, a likelihood whether each of the features are present in the image; determining, by a classifier and based on the object specification matrix and the feature data, classification results that includes respective probabilities per object that the image corresponds to the object, respective probabilities per class that the object corresponds to the class and whether features of the plurality of features are present or absent in the image; and providing, by a user interface, the classification results with the probabilities sorted in descending order and including (i) a user-specified number of the features or (ii) the features associated with probabilities that exceed a user-specified threshold.

19. The non-transitory machine-readable medium of claim 18, wherein the object specification matrix indicates, for each feature, whether the feature is present, absent, or do not care in the physical portion.

20. A device comprising: a memory device including instructions stored thereon; and processing circuitry coupled to the memory device, the processing circuitry configured to execute the instructions, the instructions, when executed by the processing circuitry cause the processing circuitry to perform operations for machine learning (ML) automatic target recognition (ATR) decision explanation, the operations comprising: receiving an object specification matrix from an object model database that indicates, for each of a plurality of physical portions of an object, whether each of a plurality of features are present or absent in a physical portion of the physical portions of the object and a proportional physical displacement between the features in the object;

receiving, from one or more deep learning (DL) models, feature data indicating for an image of a portion of the object, a likelihood whether each of the features are present in the image; determining, by a classifier and based on the object specification matrix and the feature data, classification results that includes respective probabilities per object that the image corresponds to the object, respective probabilities per class that the object corresponds to the class and whether features of the plurality of features are present or absent in the image; and providing, by a user interface, the classification results with the probabilities sorted in descending order and including (i) a user-specified number of the features or (ii) the features associated with probabilities that exceed a user-specified threshold.

* * * * *